(12) United States Patent
Kashima

(10) Patent No.: US 6,718,471 B1
(45) Date of Patent: Apr. 6, 2004

(54) ELECTRONIC INFORMATION MANAGEMENT SYSTEM, IC CARD, TERMINAL APPARATUS AND ELECTRONIC INFORMATION MANAGEMENT METHOD, AND RECORDING MEDIUM ON WHICH IS RECORDED AN ELECTRONIC INFORMATION MANAGEMENT PROGRAM

(75) Inventor: Kazunori Kashima, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/271,367

(22) Filed: Mar. 18, 1999

(30) Foreign Application Priority Data

Mar. 31, 1998 (JP) .......................... 10-087511
Nov. 4, 1998 (JP) .......................... 10-313746

(51) Int. Cl.[7] ................................ H04L 9/32
(52) U.S. Cl. .................... 713/202; 713/184
(58) Field of Search ................ 713/200–202, 713/183, 184; 711/163, 164; 345/741; 725/25, 30; 340/5.2, 5.51, 5.54; 705/18

(56) References Cited

U.S. PATENT DOCUMENTS

| 5,280,527 A | * | 1/1994 | Gullman et al. ............ 713/184 |
|---|---|---|---|
| 5,559,961 A | * | 9/1996 | Blonder ...................... 713/202 |
| 5,608,387 A | * | 3/1997 | Davies .................. 340/825.34 |
| 5,767,496 A | * | 6/1998 | Swartz et al. ............. 235/462.1 |
| 5,821,933 A | * | 10/1998 | Keller et al. ................. 345/348 |
| 5,901,339 A | * | 5/1999 | Saito ............................. 725/5 |
| 6,118,872 A | * | 9/2000 | Kashima ..................... 380/205 |
| 6,192,478 B1 | * | 2/2001 | Elledge ....................... 713/202 |
| 6,209,104 B1 | * | 3/2001 | Jalili ........................... 713/202 |
| 6,292,092 B1 | * | 9/2001 | Chow et al. .................. 340/5.6 |

OTHER PUBLICATIONS

Weisman, Robyn "Image Password Potential Doubtful, Say Analysts" Mar. 22, 2002, Newsfactor Network, http:///www.newsfactor,com/perl/printer/16910/.*
Fryer et al, "Microsoft Press Computer Dictionary" 1997, Microsoft Press, 3rd Edition, p. 137.*

* cited by examiner

Primary Examiner—Ayaz Sheikh
Assistant Examiner—Christopher Revak
(74) Attorney, Agent, or Firm—Staas & Halsey LLP

(57) ABSTRACT

An electronic information management system, an IC card, a terminal apparatus and an electronic information management method, and a recording medium on which is recorded an electronic information management program, which displays a plurality of images simultaneously or hierarchically to thereby carry out authorization of access to electronic information based on an image password which is easily remembered and difficult to appropriate.

20 Claims, 17 Drawing Sheets

FIG.8A

| USER CODE | IMAGE ENCRYPTION SOLUTION | ENCRYPTED INFORMATION | PREVIOUS USE ADDRESS | ...... |

FIG.8B

| USER CODE | USER NAME | BACKGROUND IMAGE CODE | CONTENTS TOOL CODE | TRANSITION INFORMATION CODE | USE ENVIRONMENT CODE | ...... |

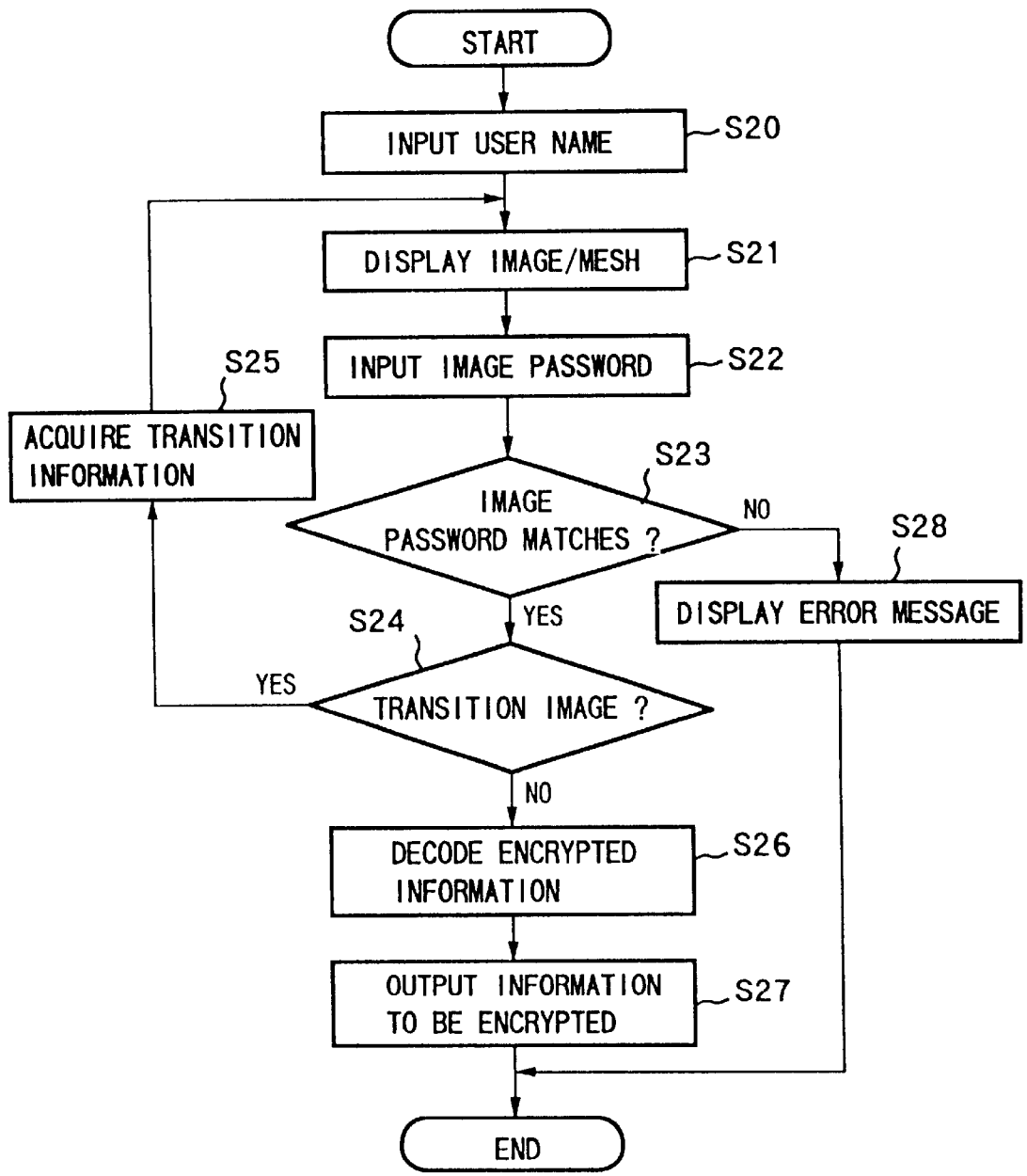

FIG.14

| USER CODE | IMAGE ENCRYPTION SOLUTION | ENCRYPTED INFORMATION A | PREVIOUS USE ADDRESS | ...... |
|---|---|---|---|---|
| | | ENCRYPTED INFORMATION B | PREVIOUS USE ADDRESS | ...... |

ELECTRONIC INFORMATION MANAGEMENT SYSTEM, IC CARD, TERMINAL APPARATUS AND ELECTRONIC INFORMATION MANAGEMENT METHOD, AND RECORDING MEDIUM ON WHICH IS RECORDED AN ELECTRONIC INFORMATION MANAGEMENT PROGRAM

BACKGROUND OF THE INVENTION

1. Field of the Invention

The present invention relates to electronic information management techniques where authorization of access to electronic information is carried out based on an input password. In particular the invention relates to techniques using passwords by specifying images (to be referred to image passwords hereinbelow) which are easy to remember and difficult to appropriate.

2. Description of the Related Art

Heretofore, various data processing systems (referred to hereunder as "systems") aimed at providing a service only to a user who has previously registered, use a password for approving system use. Desirably the user of the various systems uses a different password for each system being used. However, in present times where several passwords must be used, it becomes difficult to memorize all of the passwords. Therefore, it is common for the user to use a standardized password for all of the systems, or to use a password involving familiar data such as date of birth.

With a password involving user date of birth or the like however, since this is based on data familiar to the user, there is the likelihood that an ill-willed third party can easily appropriate this. Therefore, with the object of making it difficult to appropriate a password, a technique has been considered where the position of a single displayed image is specified, and system use is approved based on the specified position.

However, with the technique for approving system use using a single image, if the displayed image is too simple, there is the possibility that the specified points will be the same. Moreover, in the case where a single image is used, since the characteristic of human memory is such that there is a tendency for the specified points to become few, there is the problem in that it is difficult to maintain strong security.

SUMMARY OF THE INVENTION

The present invention takes into consideration the above problems with the conventional arrangement, with the object of providing a technique for using an image password which is easy to remember and difficult to appropriate, by displaying a plurality of images simultaneously or in a hierarchical structure.

Moreover, it is an object of the invention to distribute a recording medium on which is recorded the electronic information management program according to the present invention so that a person acquired such a recording medium can easily construct an electronic information management system.

According to a first aspect of the invention for achieving the above object, an electronic information management system comprises: a code information reading device for reading code information stored in an IC card, an image display device for displaying a plurality of images corresponding to the code information read by the code information reading device, an image specifying device for specifying specific parts of the respective images displayed by the image display device, and an access authorization device for authorizing access to electronic information based on the specific parts of the respective images specified by the image specifying device.

With such a construction, the plurality of images corresponding to the code information are displayed when the code information is read out from the IC card. Then, when the specific parts of the respective images displayed are specified, access is authorized to the electronic information, based on the specific parts of the respective images specified. After this, operations such as referencing and modification of the authorized electronic information are possible.

According to a second aspect of the invention, an IC card comprises: a storing device for storing code information and a plurality of images corresponding to the code information, and an access authorization device for authorizing access to electronic information based on information specifying specific parts of the respective images.

With such a construction, if there is provided with a device incorporating functions for reading the code information and the plurality of images corresponding to the code information which have been stored in the IC card and displaying the images, and for specifying the specific parts of the respective images, access is authorized to the electronic information based on the specific parts of the respective images specified. After this, operations such as referencing and modification of the authorized electronic information are possible.

According to a third aspect of the invention, a terminal apparatus comprises: an image storing device for storing a plurality of images corresponding to code information, an image display device for severally displaying the images stored by the image storing device, an image specifying device for specifying specific parts of the respective images displayed by the image display device, and an access authorization device for authorizing access to electronic information based on the specific parts of the respective images specified by the image specifying device.

With such a construction, when the code information is input, the plurality of images corresponding to the code information are displayed. Then, when the specific parts of the respective images displayed are specified, access is authorized to the electronic information based on the specific parts of the respective images specified. After this, operations such as referencing and modification of the authorized electronic information are possible.

According to a fourth aspect of the invention, an electronic information management system comprises: an image storage device for storing a plurality of images, an image display device for severally displaying selectively the images stored in the image storage device, an image specifying device for severally specifying specific parts of the respective images displayed by the image display device, a password generating device for generating a password based on the specific parts of the respective images specified by the image specifying device, and an access authorization device for authorizing access to electronic information based on the password generated by the password generating device.

With such a construction, the image stored in the image storage device is severally displayed selectively by the image display device. Then, when the specific parts of the respective images displayed are specified by means of the image specifying device, a password is generated by the password generating device based on the specific parts of the respective images specified. Once the password is generated, access is authorized to the electronic information by the access authorization device, based on the generated password. After this, operations such as referencing and modification of the authorized electronic information are possible.

At this time, according to the first to fourth aspects of the invention, if a plurality of specific parts for the plurality of images are specified, then the combinations for specifying the specific parts of the images become enormous. In particular, when a large number of images are displayed, this effect is remarkable. Accordingly, even if a third party attempting to appropriate the electronic information properly specifies the specific parts of the image, the possibility of matching with the password of a user having proper authority is very low, and hence a strong security can be maintained. Furthermore, when the specific parts of the image are specified, if the specified sequence is set so as to have a story characteristic, the specified sequence can be grasped as an image. Consequently, compared to conventional passwords using English letters and numerals, it is possible to have one which can be easily remembered and which is difficult to forget.

Furthermore, the construction may be such that the image display device severally displays simultaneously the images.

With such a construction, since the images are severally displayed simultaneously, then if the specific parts of the image are specified by scanning across the various images, the combinations specifying the specific parts of the image can be dramatically increased. Therefore it is extremely difficult for a third party planning to appropriate the electronic information to arrive at the correct password, and hence the strength of the security can be further improved.

Moreover, the construction may be such that the image display device displays the images in a hierarchical structure one after another, in accordance with the specific parts of the images specified by the image specifying device.

With such a construction since the images are displayed in a hierarchical structure one after another, in accordance with the specific parts of the specified images, then by deepening the hierarchical structure, the combinations specifying the specific parts of the image can be dramatically increased. Therefore it is extremely difficult for a third party planning to appropriate the electronic information to arrive at the correct password, and hence the strength of the security can be further improved.

In addition, the construction may be such that the image specifying device specifies specific parts of the image displayed by the image display device by means of rectangular regions which are marked out at predetermined spacing.

With such a construction, since the specific part of the image is specified by means of a rectangular region, then by specifying a point within the rectangular region, the rectangular region is specified. Consequently, the operation of specifying a specific part of the image by the user of the electronic information management apparatus is facilitated, and erroneous operation where a mistaken specific part is specified can be reduced.

Moreover, the construction may be such that the image specifying device specifies the specific parts of the image displayed by the image display device, by means of constituent elements constituting the image.

Here, the "constituent element" is for example in the case where the image represents a building, a billboard, a window, a door or the like being a part constituting the building.

With such a construction, since the specific part of the image is specified by way of the constituent element constituting the image, then even if the constituent element is a complicated shape, this can be easily specified. Consequently, the operation of specifying a specific part of the image by the user of the electronic information management apparatus is facilitated, and erroneous operation where a mistaken specific part is specified can be reduced.

According to a fifth aspect of the invention, an electronic information management method comprises: a code information reading step for reading code information stored in an IC card, an image display step for displaying a plurality of images corresponding to the code information read by the code information reading step, an image specifying step for specifying specific parts of the respective images displayed by the image display step, and an access authorization step for authorizing access to electronic information based on the specific parts of the respective images specified by the image specifying step.

With such a construction, the plurality of images corresponding to the code information are displayed when the code information is read out from the IC card. Then, when the specific parts of the respective images displayed are specified, access is authorized to the electronic information, based on the specific parts of the respective images specified. After this, operations such as referencing and modification of the authorized electronic information are possible.

According to a sixth aspect of the invention, an electronic information management method comprises: an image display step for severally displaying selectively images from among a plurality of images, an image specifying step for specifying specific parts of the respective images displayed by the image display step, a password generating step for generating a password based on the specific parts of the respective images specified by the image specifying step, and an access authorization step for authorizing access to electronic information based on the password generated by the password generating step.

With such a construction, images are severally displayed selectively from among the plurality of images by the image display step. Then, when the specific parts of the respective images displayed are specified by means of the image specifying step, a password is generated by the password generating step based on the specific parts of the respective images specified. Once the password is generated, access is authorized to the electronic information by the access authorization step, based on the generated password. After this, operations such as referencing and modification of the authorized electronic information are possible.

At this time, according to the fifth and sixth aspects of the invention, if a plurality of specific parts of the plurality of images are specified, then the combinations for specifying the specific parts of the images become enormous. In particular, when a large number of images are displayed, this effect is remarkable. Accordingly, even if a third party attempting to appropriate the electronic information properly specifies the specific parts of the image, the possibility of matching with the password of a user having proper authority is very low, and hence a strong security can be maintained. Furthermore, when the specific parts of the image are specified, if the specified sequence is set so as to have a story characteristic, the specified sequence can be grasped as an image. Consequently, compared to conventional passwords using English letters and numerals, it is possible to have one which can be easily remembered and which is difficult to forget.

Furthermore, the construction may be such that the image display step severally displays simultaneously the images.

With such a construction, since the images are severally displayed simultaneously, then if the specific parts of the image are specified by scanning across the various images, the combinations specifying the specific parts of the image can be dramatically increased. Therefore it is extremely difficult for a third party planning to appropriate the electronic information to arrive at the correct password, and hence the strength of the security can be further improved.

Moreover, the construction may be such that the image display step displays the images in a hierarchical structure one after another, in accordance with the specific parts of the images specified by the image specifying step.

With such a construction since the images are displayed in a hierarchical structure one after another, in accordance with the specific parts of the specified images, then by deepening the hierarchical structure, the combinations specifying the specific parts of the image can be dramatically increased. Therefore it is extremely difficult for a third party planning to appropriate the electronic information to arrive at the correct password, and hence the strength of the security can be further improved.

According to a seventh aspect of the invention, there is a recording medium on which is recorded an electronic information management program for realizing: a code information reading function for reading code information stored in an IC card, an image display function for displaying a plurality of images corresponding to the code information read by the code information reading function, an image specifying function for specifying specific parts of the respective images displayed by the image display function, and an access authorization function for authorizing access to electronic information based on the specific parts of the respective images specified by the image specifying function.

Here the "recording medium" is one which can reliably record the electronic information, and if necessary one which can reliably output this. For example, a portable medium such as a magnetic tape, magnetic disc, magnetic drum, IC card, CD-ROM and the like.

With such a construction, an electronic information management program for realizing a code information reading function, an image display function, an image specifying function, and an access authorization function is stored on the recording medium. Consequently, the electronic information management program according to the present invention can be distributed. Hence a person acquired the recording medium on which the program is recorded can easily construct an electronic information management system.

According to an eighth aspect of the invention, there is a recording medium on which is recorded an electronic information management program for realizing: an image display function for severally displaying images selectively from among a plurality of images, an image specifying function for specifying specific parts of the respective images displayed by the image display function, a password generating function for generating a password based on the specific parts of the respective images specified by the image specifying function, and an access authorization function for authorizing access to electronic information based on the password generated by the password generating function.

With such a construction, an electronic information management program for realizing an image display function, an image specifying function, a password generating function, and an access authorization function is stored on the recording medium. Consequently, the electronic information management program according to the present invention can be distributed. Hence a person acquired the recording medium on which the program is recorded can easily construct an electronic information management system.

Furthermore, the construction may be such that the image display function severally displays simultaneously the images.

With such a construction, since the images are severally displayed simultaneously, then if the specific parts of the image are specified by scanning across the various images, the combinations specifying the specific parts of the image can be dramatically increased. Therefore it is extremely difficult for a third party planning to appropriate the electronic information to arrive at the correct password, and hence the strength of the security can be further improved.

Moreover, the construction may be such that the image display function displays the images in a hierarchical structure one after another, in accordance with the specific parts of the images specified by the image specifying function.

With such a construction, since the images are displayed in a hierarchical structure one after another, in accordance with the specific parts of the specified images, then by deepening the hierarchical structure, the combinations specifying the specific parts of the image can be dramatically increased. Therefore it is extremely difficult for a third party planning to appropriate the electronic information to arrive at the correct password, and hence the strength of the security can be further improved.

According to a ninth aspect of the invention, an electronic information management system comprises: an image display device for displaying a plurality of images of different attributes, an image specifying device for specifying specific parts of the respective images displayed by the image display device, and an access authorization device for authorizing access to electronic information based on the specific parts of the respective images specified by the image specifying device.

With such a construction, the plurality of images of different attributes are displayed by the image display device. Then, when the specific parts of the respective images displayed are specified by the image specifying device, access is authorized to the electronic information by the access authorization device based on the specific parts of the respective images specified. After this, operations such as referencing and modification of the authorized electronic information are possible.

At this time, in a case that a plurality of specific parts of the plurality of images are specified, if the specified sequence is considered, then the combinations for specifying the specific parts of the images become enormous. In particular, when a large number of images are displayed, this effect is remarkable. Accordingly, even if a third party attempting to appropriate the electronic information properly specifies the specific parts of the image, the possibility of matching with the password of a user having proper authority is very low, and hence a strong security can be maintained. Furthermore, when the specific parts of the image are specified, if the specified sequence is set so as to have a story characteristic, the specified sequence can be grasped as an image. Consequently, compared to conventional passwords using English letters and numerals, it is possible to have one which can be easily remembered and which is difficult to forget.

Furthermore, the construction may be such that the images of different attributes are constituted of an image indicating a thing and an image indicating a plurality of characters.

With such a construction, since the images are constituted of the image indicating a thing and the image indicating the plurality of characters, a screen construction becomes more complicated to a third party.

Moreover, the construction may be such that the images of different attributes are constituted of an image comprising a single image, and an image comprising a plurality of objects.

With such a construction, since the images are constituted of the image comprising a single image, and the image comprising a plurality of objects, a screen construction becomes more complicated to a third party.

According to a tenth aspect of the invention, there is a recording medium on which is recorded an electronic information management program for realizing: an image display function for displaying a plurality of images of different attributes, an image specifying function for specifying specific parts of the respective images displayed by the image display function, and an access authorization function for authorizing access to electronic information based on the specific parts of the respective images specified by the image specifying function.

With such a construction, an electronic information management program for realizing an image display function, an image specifying function, and an access authorization function is stored on the recording medium. Consequently, the electronic information management program according to the present invention can be distributed. Hence a person acquired the recording medium on which the program is recorded can easily construct an electronic information management system.

Other objects, and aspects of the present invention will become apparent from the following description of embodiments given in conjunction with the appended drawings.

BRIEF DESCRIPTION OF THE DRAWINGS

FIG. 8 is an explanatory diagram showing information to be registered in a data base by initial registration processing, FIG. 8(A) being the registration contents of an encrypted information data base, and FIG. 8(B) being the registration contents of a setting information data base;

FIG. 9 is a flow chart for explaining image password use processing;

FIG. 14 is an explanatory diagram of information to be registered in the encrypted information data base by the additional registration processing.

DESCRIPTION OF THE PREFERRED EMBODIMENT

As follows is a detailed description of the present invention with reference to the appended drawings.

Figure 1:
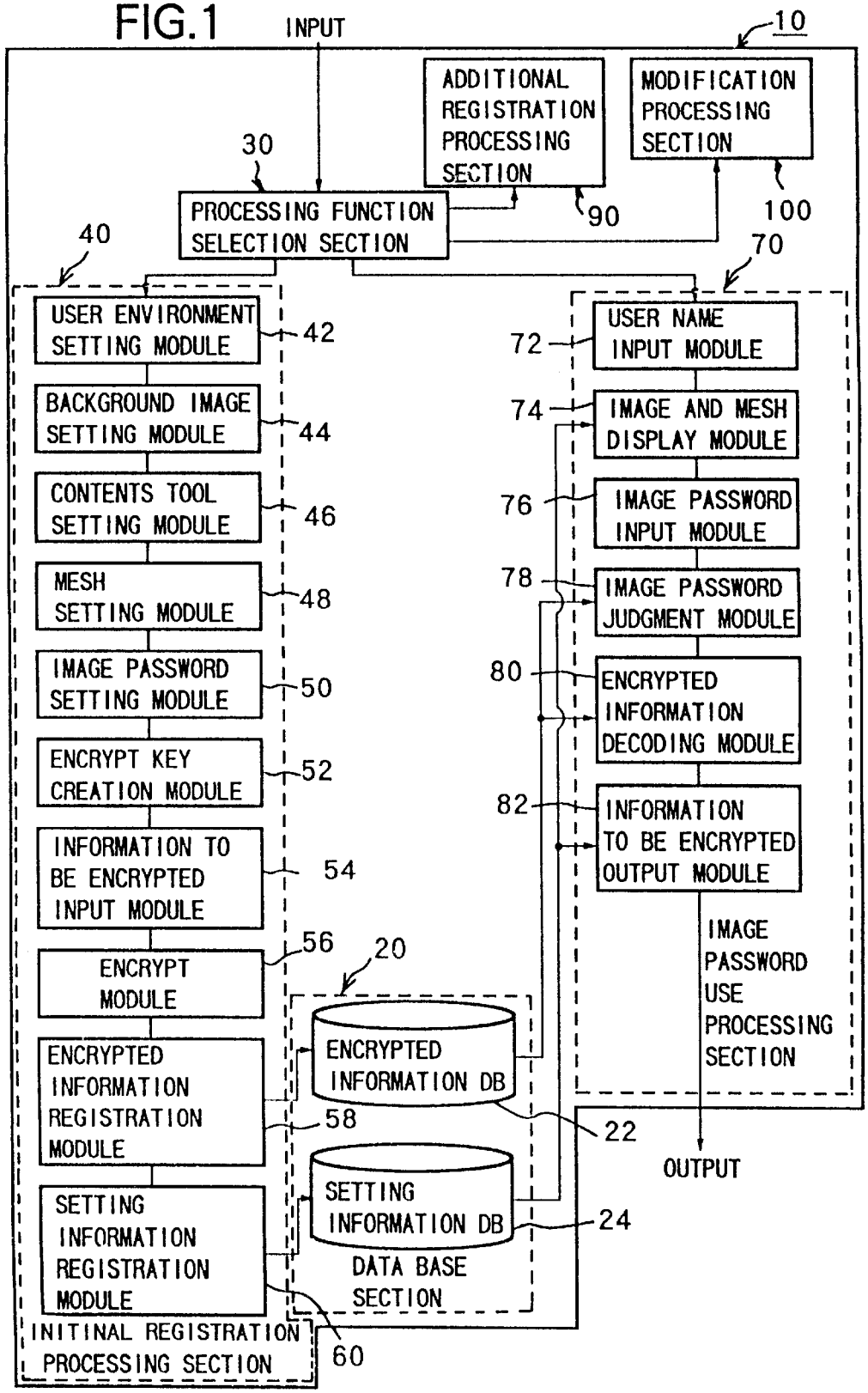
FIG. 1 is a block diagram showing an embodiment of an electronic information management system according to the present invention.

FIG. 1 shows an embodiment of an electronic information management system according to the present invention.

The electronic information management system 10 comprises; a data base section 20, a processing function selection section 30, an initial registration processing section 40, an image password use processing section 70, an additional registration processing section 90, and a modification processing section 100. The electronic information management system 10 incorporating at least a central processing unit (CPU) and a memory, comprises a computer for executing a program in the memory.

The data base section 20 comprises an encrypted information data base 22, and a setting information data base 24. In the encrypted information data base 22 is registered for example information to be encrypted (to be described later), which has been encrypted (referred to hereunder as encrypted information). In the setting information data base 24 is registered various setting information (to be described in detail later) which has been initially set in the initial registration processing section 40.

The processing function selection section 30 selectively activates the initial registration processing section 40, the image password use processing section 70, the additional registration processing section 90, or the modification processing section 100, in accordance with instructions from the user of the electronic information management system 10 (abbreviated hereunder to user).

The initial registration processing section 40 executes sequential processing (referred to hereunder as initial registration processing) for carrying out an initial registration of a password according to image specification. The initial registration processing section 40 comprises; a user environment setting module 42, a background image setting module 44, a contents tool setting module 46, a mesh setting module 48, an image password setting module 50, an encrypt key creation module 52, an information to be encrypted input module 54, an encrypt module 56, an encrypted information registration module 58, and a setting information registration module 60.

The user environment setting module 42 executes setting processing for the user environment of for example the name of the user (referred to hereunder as the user name), and the browser used by the user. The user name need not be the actual name of the user, and for example this may be set to a nickname familiar to the user, or to a name which a third party would not guess for the user.

In the background image setting module 44 is executed the setting processing of the background image which becomes the setting object for the image password. The background image is selected by the user from various images registered for example in an external storage unit (image storage device: not shown in the figure) of the electronic information management system 10. The background image may use an image registered in another electronic information management system 10 connected to the electronic information management system 10 via a network, or in an external storage unit such as a host.

In the contents tool setting module 46 is executed setting processing of various images displayed together with the background image, or various images displayed instead of the background image (referred to hereunder as contents tools). The contents tool is selected by the user in the same way as the background image, from various images registered in the electronic information management system 10 or in the external storage unit of the other electronic information management system 10. With the contents tool, it is desirable that constituent elements independently from each other are constituted of such as button and object.

The mesh setting module 48 carries out setting processing of the mesh to be displayed superimposingly on the background image, that is to say a rectangular region marked out at predetermined spacing. By setting the mesh, then when the user specifies a point within the rectangular region, the operation assigned to the rectangular region results, so that reproducibility of the specifying is improved.

The image password setting module 50 executes setting processing of the image password. That is to say, by pointing to the rectangular region superimposingly displayed on the background image using a pointing device such as a mouse or touch panel, the specification of the specific part of the background image is carried out. Moreover, when the contents tool itself or a constituent element of the contents tool, for example, an image of an electric train is displayed, then by pointing to the door, window etc. of the electric train, the specific part of the contents tool is specified. Moreover, the image password is set by registering the specific parts and specified sequence of the specified images.

The encrypt key creation module 52 executes encrypt key creation processing. The encrypt key is computed by substituting a set image password in a predetermined encrypt key creation formula, as a variable.

The information to be encrypted input module 54 executes input processing of the information to be encrypted which the user intends to encrypt. The information to be encrypted is for example a user access code which is registered on an IC card, and which is input from an input device such as a card reader. With the electronic information management system 10 of the present embodiment, if the information to be encrypted is once registered, then when the electronic information management system 10 is used subsequently, it is not necessary to reinput the information to be encrypted.

The encrypt module 56 executes encryption processing of the input information to be encrypted. The encrypting of the information to be encrypted utilizes known techniques such as DES (Data Encryption Standard). For example this is implemented by sequentially changing respective elements of the information to be encrypted, based on the encrypt key.

The encrypted information registration module 58 executes processing to register encrypted information and the like in the encrypted information data base 22.

The setting information registration module 60 executes processing to register set user environment, background image, contents tool, mesh setting information and the like in the setting information data base 24.

The image password use processing section 70 executes sequential processing (referred to hereunder as image password use processing) for carrying out access authorization to the electronic information, based on the input image password. The image password use processing section 70 comprises; a user name input module 72, an image and mesh display module 74, an image password input module 76, an image password judgment module 78, an encrypted information decoding module 80, and an information to be encrypted output module 82.

The image and mesh display module 74 operates as an image display device, an image display step, and an image display function. Furthermore the image password input module 76 operates as an image specifying device and a password generating device, an image specifying step and a password generating step, and an image specifying function and a password generating function. Moreover, the image password judgment module 78 operates as an access authorization device, an access authorization step, and an access authorization function.

The user name input module 72 executes input processing for the user name. That is to say, input of the user name set in the initial registration processing is carried out. With the input of the user, the user name may be selected from an already set user name list, or may be input directly from an input device such as a keyboard.

The image and mesh display module 74 executes the processing for displaying the image corresponding to the input user name (referred to as the background image and/or the contents tool, and similarly hereunder) and the mesh. The image and the mesh to be displayed are those which are set in the initial registration processing. Display or non-display of the mesh may be made optionally selectable by the user.

The image password input module 76 executes input processing of the image password. That is to say, executes processing for severally specifying the specific parts or the structural elements of the displayed image. The specific parts or structural elements of the specified image are rearranged numerically in a specified sequence, and for example stored in memory. Now with the image password input module 76, the color or the pattern of the specified rectangular region of the background image on which the mesh is superimposingly displayed can be changed to clearly define the rectangular region which is specified by the user.

The image password judgment module 78 executes judgment processing as to whether or not the input image password matches the image password set in the initial registration processing. Only when judged that the image passwords match, are the encrypted information decoding module 80 to be described later and the information to be encrypted output module 82 activated.

The encrypted information decoding module 80 executes processing for decoding the encrypted information registered in the encrypted information data base 22.

The information to be encrypted output module 82 executes processing for displaying the decoded information to be encrypted, or for outputting to the outside. At this time, based on the set information recorded in the setting information data base 24, the user can decide on the browser to use and the address of the transmission destination to which the information to be encrypted is to be sent.

The additional registration processing section 90 executes processing to add other information to be encrypted (referred to hereunder as additional registration processing) in addition to the information to be encrypted which is input in the initial registration processing.

The modification processing section 100 executes processing for modifying the background image, the contents tool, the image password, and the information to be encrypted etc., which is set in the initial registration processing (referred to hereunder as modification processing).

Next is a description of the operation of the electronic information management system 10 of such a construction, with reference to the flow charts and various diagrams of FIG. 2 through FIG. 15.

Figure 2:
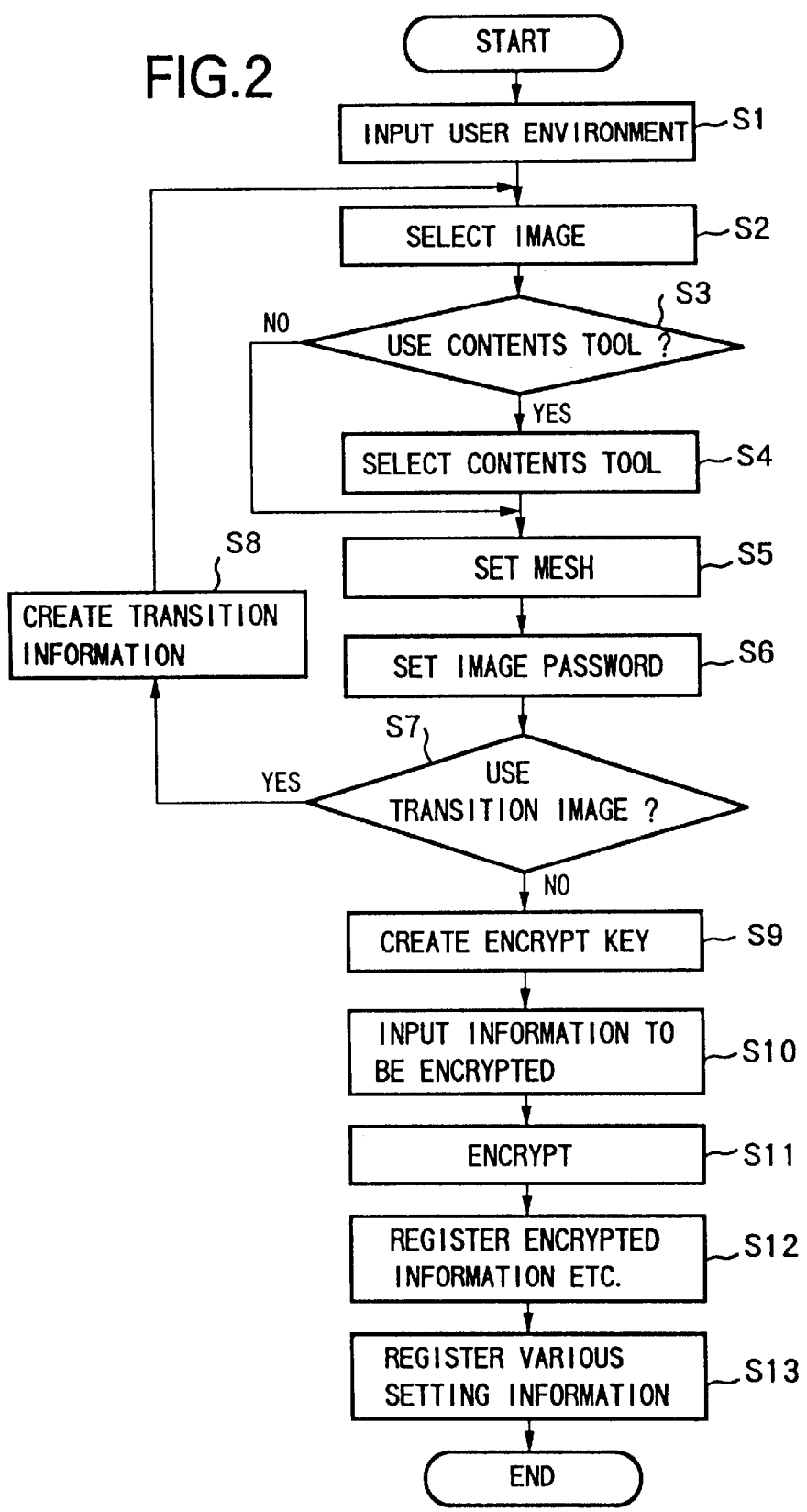
FIG. 2 is a flow chart for explaining initial registration processing.

FIG. 2 is a flowchart illustrating the initial registration processing.

Figure 3:
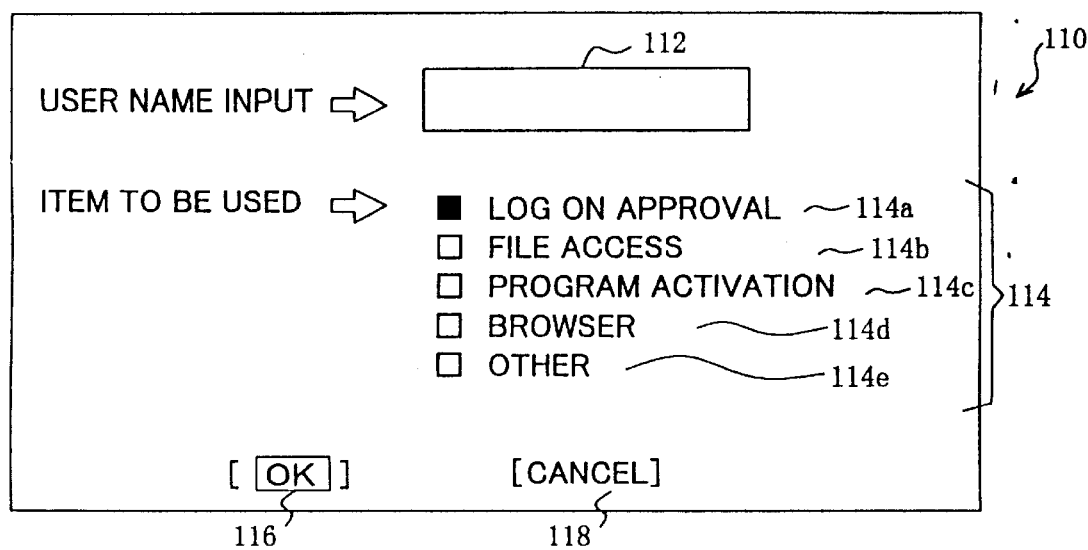
FIG. 3 is an explanatory diagram of a user environment setting screen.

In step 1 (referred to as S1 in the figure, with subsequent steps denoted similarly) the user environment is input. That is to say, through the function of the user environment setting module 42, a user environment input screen 110 such as shown in FIG. 3 is displayed. The user environment input screen 110 comprises; an input frame 112 for input of the user's name, a plurality of radio buttons 114 (114a~114e) for setting the item to be used, an OK button 116, and a cancel button 118. After inputting the user's name and setting the item to be used, the OK button 116 is pressed and control proceeds to step 2. On the other hand, if the cancel button 118 is pressed, the initial registration processing is terminated.

Figure 4:
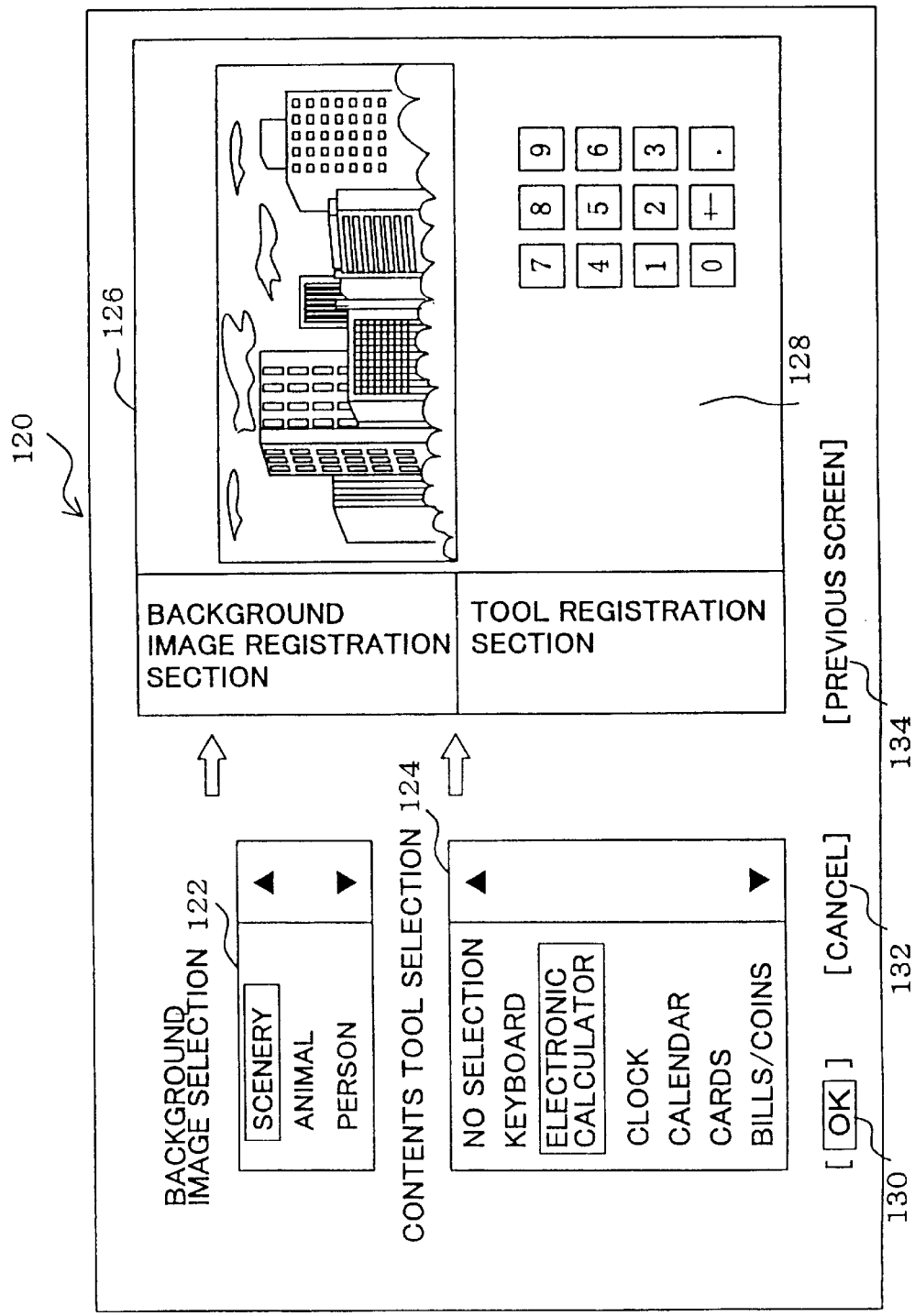
FIG. 4 is an explanatory diagram of an image setting screen.
Figure 5:
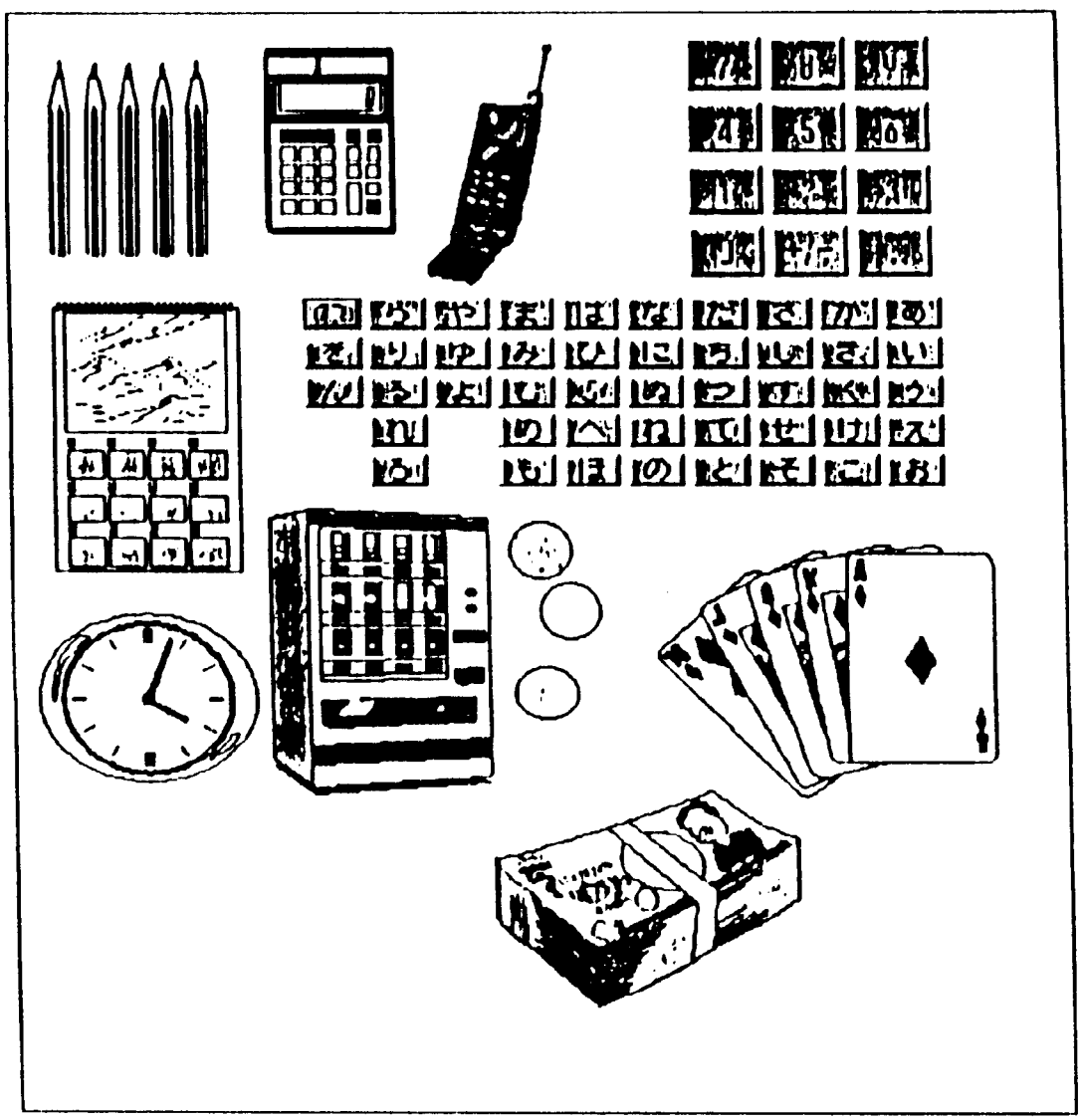
FIG. 5 is a diagram illustrating various examples of contents tools.

In step 2 through step 4, the image is set. That is to say, through the function of the background image setting module 44 and the contents tool setting module 46, an image setting screen 120 such as shown in FIG. 4 is displayed. The image setting screen 120 comprises; a background image selection box 122, a contents tool selection box 124, a background image registration section 126, a tool registration section 128, an OK button 130, a cancel button 132, and a previous screen button 134. Displayed on the background image selection box 122 is a list of previously registered background images, and the desired background image is selected from this list. In the contents tool selection box 124 is displayed a list of various contents tools such as shown for example in FIG. 5, and the desired contents tool is selected from this list. Now included in the list of contents tools is a selection branch which stops selection of the contents tools, that is to say stops display of the contents tools. In the background image registration section 126 is displayed the selected background image. In the tool registration section 128 is displayed the selected contents tools. Consequently, by viewing the images displayed in the background image registration section 126 and in the tool registration section 128, the screen construction for inputting the image password can be confirmed.

After selecting the background image (S2) and selecting the contents tools (S3, S4) the OK button 130 is pressed and control proceeds to step 5. On the other hand, if the cancel button 132 is pressed, the initial registration processing is terminated. Moreover, if the previous screen button 134 is pressed, control returns to step 1, and the user environment setting screen 110 is displayed.

In step 2 and step 4 wherein setting of image is carried out, a plurality of background images and a plurality of contents tools may be set. In this case, the screen construction may be set automatically according to the setting sequence, or, a layout function may be provided so that a user can set the screen construction.

Figure 6:
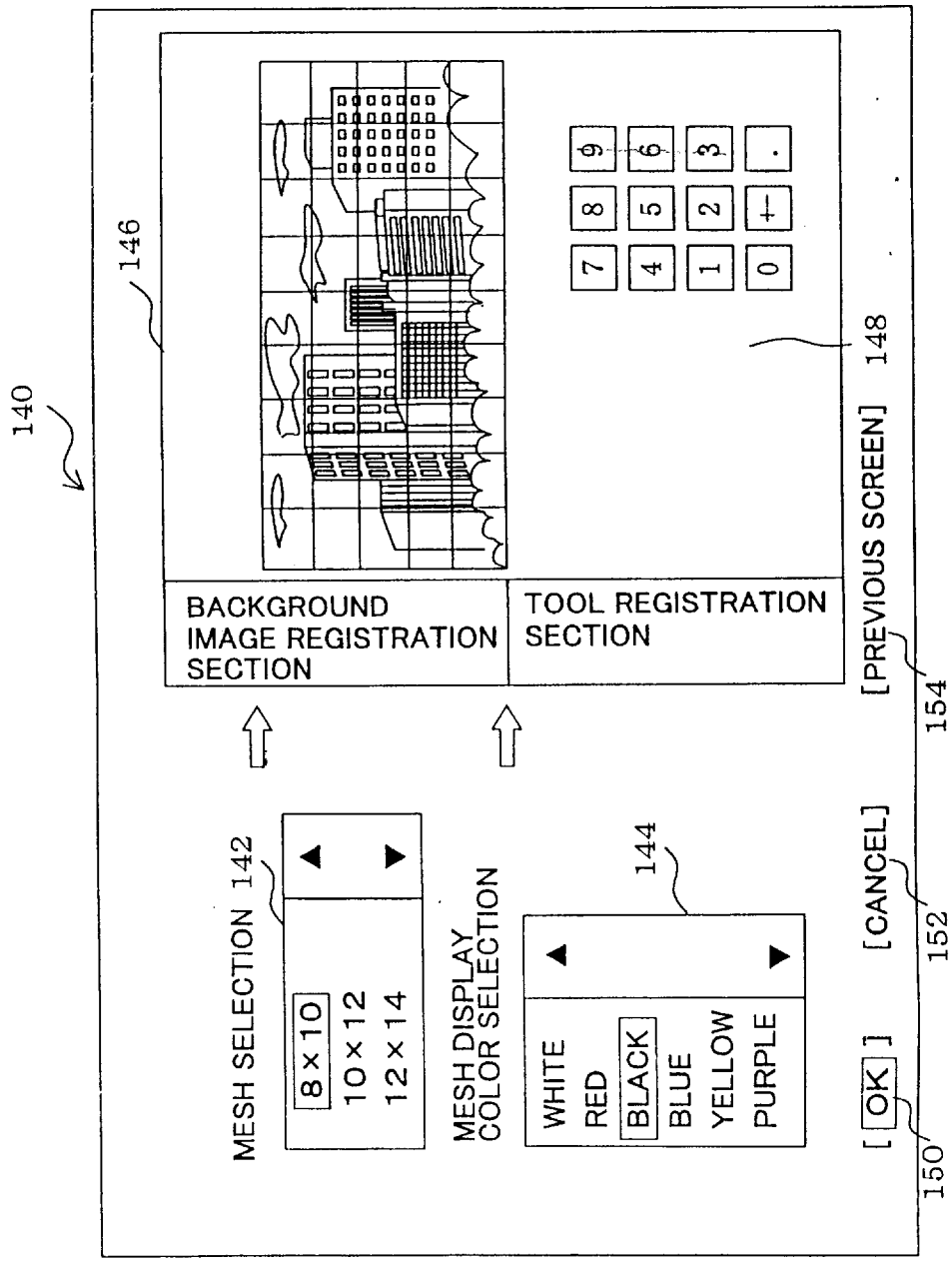
FIG. 6 is an explanatory diagram of a mesh setting screen.

In step 5, the mesh for being superimposingly displayed on the background image is set. That is to say, through the function of the mesh setting module 48, a mesh setting screen 140 such as shown in FIG. 6 is displayed. The mesh setting screen 140 comprises; a mesh selection box 142, a display color selection box 144, a background image registration section 146, a tool registration section 148, an OK button 150, a cancel button 152, and a previous screen button 154. In the mesh selection box 142 is displayed a list of the mesh sizes (the number of rectangular horizontal and vertical regions), and the desired size is selected from this list. In the display color selection box 144 is displayed a list of colors for the mesh displayed on the background image, and the desired color is selected from this list. In the background image display section 146 is displayed the background image and the mesh. In the tool registration section 148 is displayed the contents tool set in the image selection screen 120.

After setting the mesh size and the display color, the OK button 150 is pressed and control proceeds to step 6. On the other hand, if the cancel button 152 is pressed, the initial registration processing is terminated. Moreover, if the previous screen button 154 is pressed, control returns to step 2, and the image setting screen 120 is displayed.

Figure 7:
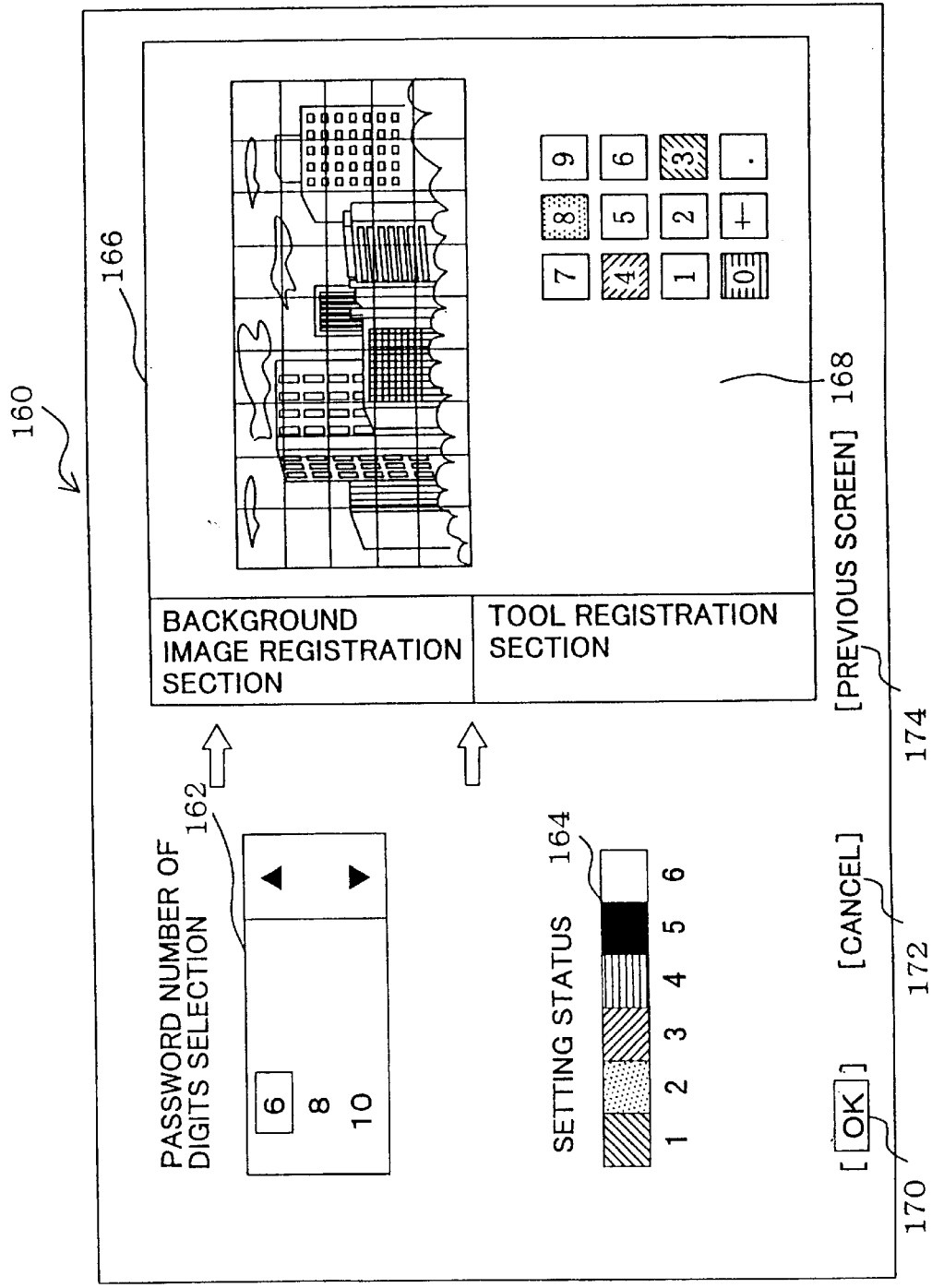
FIG. 7 is an explanatory diagram of an image password setting screen.

In step 6, the image password is set. That is to say, through the function of the image password setting module 50, an image password setting screen 160 such as shown in FIG. 7 is displayed. The image password setting screen 160 comprises; a number of digits selection box 162, a setting status display section 164, a background image registration section 166, a tool registration section 168, an OK button 170, a cancel button 172, and a previous screen button 174. In the number of digits selection box 162 is displayed a list of the number of digits for the image password, and the desired number of digits is selected from this list. In the setting status display section 164 is displayed various elements and setting sequence for the image password set by processing to be described later. With the background image registration section 166 and the tool registration section 168, since these are the same as the background image registration section 146 and the tool registration section 148 in the beforementioned mesh selection screen 140, description thereof will be omitted.

In the case of setting the image password, after setting the number of digits for the image password, a specific part of the background image or the contents tool is specified with a pointing device. Once this is done, the color of the specified rectangular region of the background image and the constituent element of the contents tool is changed, and the specified rectangular region or the constituent element is displayed according to the specified sequence on the setting status display section 164. Now in FIG. 7, the condition is shown where the number of digits for the image password is set to "6", keys "3", "8", "4", "0" are specified from the ten keys of the contents tool, and the rectangular region of the background image seventh from the left and third from the bottom (represented hereunder by coordinate data (7, 3), and similarly in the following) is specified. After setting the image password, the OK button 170 is pressed and control proceeds to step 7. On the other hand, if the cancel button 172 is pressed, the initial registration processing is terminated. Moreover, if the previous screen button 174 is pressed, control returns to step 5, and the mesh setting screen 140 is displayed.

In step 7, selection is made as to whether or not to use transition images. That is to say, selection is made as to whether or not to display the images one by one in a hierarchical structure. Then in the case where transition images are used, control proceeds to step 8 (YES), to create transition information for displaying transition images, and this transition information is registered in the setting information data base 24. After this, control returns to step 2, and the processing of step 2 and thereafter is repeated. On the other hand, in the case where transition images are not used (also including the case where image setting processing is finished), control proceeds to step 9 (NO).

In step 9, creation of the encrypt key is carried out. That is to say, the encrypt key is created through the function of the encrypt key creation module 52, based on the image password set in step 6.

In step 10, the information to be encrypted is input. To explain for the case where the information to be encrypted on an IC card is input, at first the IC card is inserted into the card reader. Once this is done, the information to be encrypted which is registered on the IC card is read by the card reader reading section.

In step 11, encryption of the information to be encrypted and creation of the image encryption solution are carried out. That is to say, the information to be encrypted is encrypted based on the encrypt key created in step 9.

To explain an example of an encryption algorithm, for example, it is assumed that in step 6, the background image is specified in the order of coordinate data (1, 2), (3, 8), (7, 8), and (10, 2). The encryption is carried out by means of a DES computational formula, by for example initially replacing x with y, and then replacing y with x, based on various values of x and y for the coordinate data (x, y). For example, if the information to be encrypted is "1234" then the encryption is carried out in the following manner.

| | | |
|---|---|---|
| (1) | Information to be encrypted | . . . 1234 |
| (2) | (1, 2): replace 1 with 2 | . . . 2234 |
| (3) | (3, 8): replace 8 with 3 (no replacement) | . . . 2234 |
| (4) | (7, 8): replace 7 with 8 (no replacement) | . . . 2234 |
| (5) | (10, 2): replace 2 with 0 | . . . 0034 |

With this encryption, the encrypted information becomes "0034". At this time, since the encrypted information only involves replacement of the elements of the information to be encrypted, the data quantity does not change.

Moreover, the image encryption solution is the encryption solution which is used at the time of decoding the encrypted information. More specifically it is a value for where the encrypted information is subtracted from the information to be encrypted. With the above example, the image encryption solution is obtained as follows.

Image encryption solution = (information to be encrypted) − (encrypted information)
= 1234 − 0034
= 1200

In step 12, the encrypted information and the image encryption solution are registered in the encrypted information data base 22.

In step 13, various setting information which is set or created in step 1 through step 8, is registered in the setting information data base 24.

With the above described processing in step 1 through step 13, the various information as shown in FIG. 8 is registered in the encrypted information data base 22 and the setting information data base 24. That is to say, as shown in FIG. 8(A), the user code, the image encryption solution, the encrypted information, the previous use address etc. is registered in the encrypted information data base 22. For the user code is set a code for identifying the user who executed the initial registration processing. In the previous use address is set the address of the transmission destination to which the information to be encrypted is sent in the image password use processing.

Furthermore, as shown in FIG. 8(B), the user code, the user name, the background image code, the contents tool code, the transition information code, the use environment code, etc. are registered in the setting information data base 24. For the user code, as with the user code for the encrypted information data base 22, is set a code for identifying the user who executed the initial registration processing. For the background image code is set at least one code for identifying the background image. For the contents tool code is set at least one code for identifying the contents tool. Now in the case where the contents tool is not used, then needless to say it is not necessary to set anything for the contents tool code. For the transition information code is set information for using the transition image, more specifically, a code for identifying the transition information created in step 8. For the use environment code is set a code for identifying for example the utilized browser set in step 1.

FIG. 9 is a flow chart illustrating image password use processing.

Figure 10:
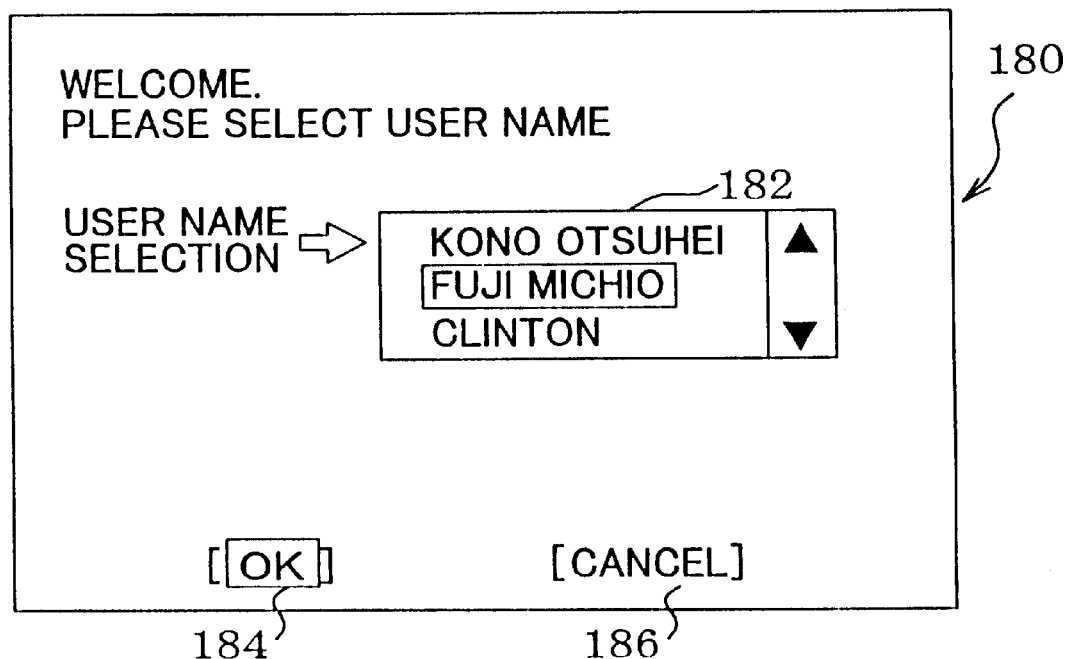
FIG. 10 is an explanatory diagram of a user name input screen.

In step 20, input of the user name is carried out. That is to say, through the function of the user name input module 72, a user name input screen 180 such as shown in FIG. 10 is displayed. The user name input screen 180 comprises; a user name selection box 182, an OK button 184, and a cancel button 186. In the user name selection box 182 is displayed a list of user names set in the initial user registration processing, and the user selects his/her own name from amongst this list. Then, after selecting the user name, the OK button 184 is pressed and control proceeds to step 21. On the other hand, if the cancel button 186 is pressed, image password use processing is terminated.

Figure 11:
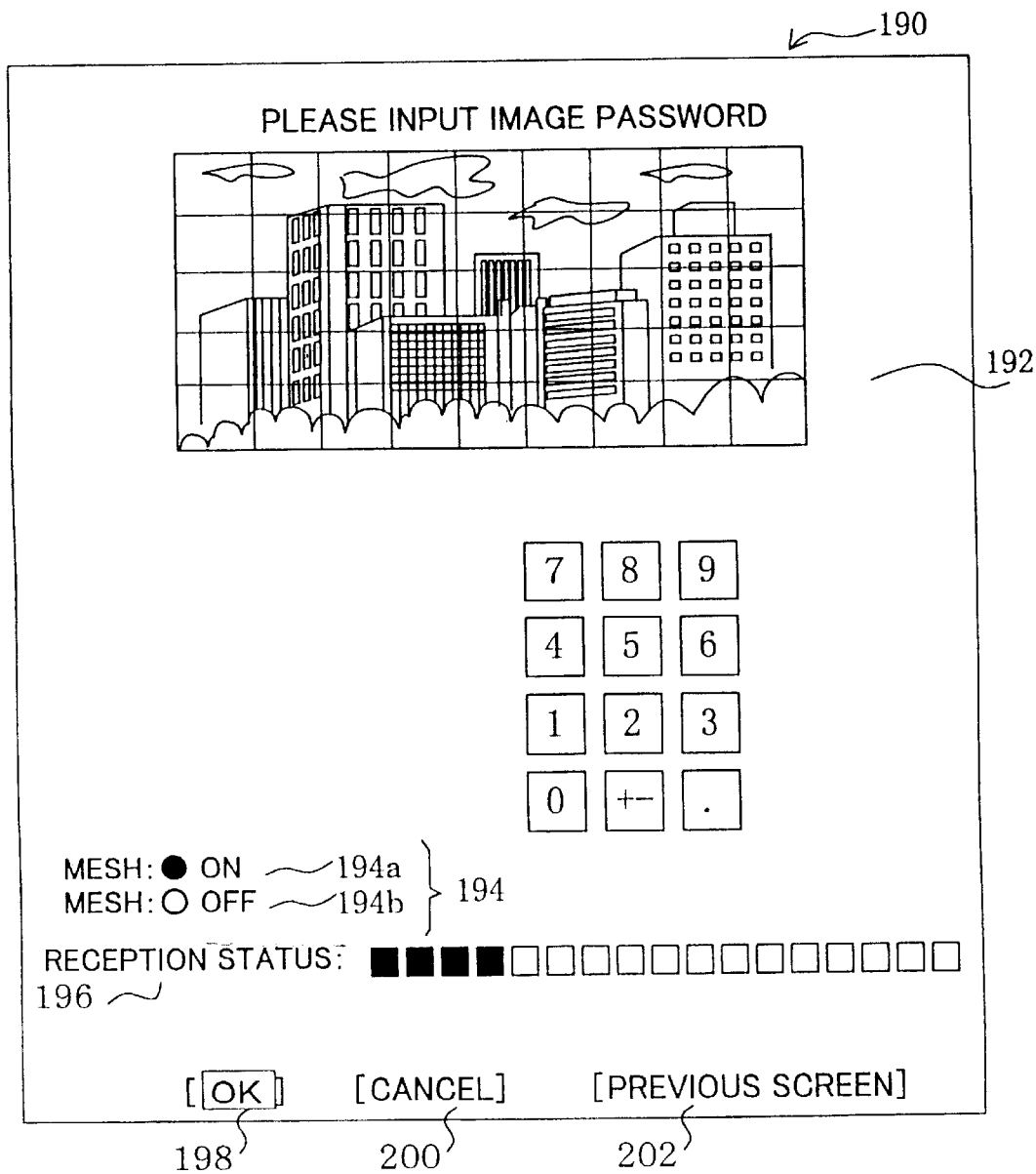
FIG. 11 is an explanatory diagram of an image password input screen.

In step 21, display of the image and mesh is carried out. That is to say, through the function of the image and mesh display module 74 and the image password input module 76, an image password input screen 190 such as shown in FIG. 11 is displayed. The image password input screen 190 comprises; an image display section 192, a mesh display/not display selection section 194, a reception status display section 196, an OK button 198, a cancel button 200, and a previous screen button 202. Displayed in the image display section 192 is a background image and a contents tool which are registered in the setting information data base 24. Now in the case where the contents tool his not set, needless to say the contents tool is not displayed. The mesh display/not display selection section 194 comprises radio buttons 194*a*, 194*b*, for specifying mesh display (ON) or no mesh display (OFF). Pressing the radio buttons 194*a*, 194*b* switches between mesh ON and mesh OFF. Displayed in the reception status display section 196 is the input status of the image password.

In step 22 input of the image password is carried out. That is to say, the image password is input by specifying with a pointing device a specific part of the image displayed in the image display section 192. A proviso is that the input of the image password must be carried out according to the specific parts and the specified sequence, set in the initial registration processing.

On completion of input of the image password for the image being displayed, the OK button 198 is pressed and control proceeds to step 23. On the other hand, if the cancel button 200 is pressed, image password use processing is terminated. Moreover, if the previous screen button 202 is pressed, control returns to step 20, and the user name input screen 180 is displayed.

In step 23, judgment is made as to whether or not the input image password matches the image password set by the initial registration processing. If judged that the image passwords match, control proceeds to step 24 (YES), while if the image passwords do not match, control proceeds to step 28 (NO).

In step 24, judgment is made as to whether or not there is a transition image. That is to say, by referring to the transition information code of the setting information data base 24, it is judged if setting for the transition image has been carried out. In the case of a transition image, control proceeds to step 25 (YES), and the transition information identified by the transition information code is acquired, after which control returns to step 21. On the other hand, in the case of no transition image, control proceeds to step 26 (NO).

In this way, by judging for the presence of the transition image, then the images of a hierarchical structure are displayed one by one in accordance with the specific part and specified sequence of the specified images, and input of the image password is carried out for the displayed respective images. Consequently, with deepening of the hierarchical structure, the input points for the image password increase so that a strong security is ensured. In this case, since the image password is memorized as an image, then even if the hierarchical structure is deepened, the possibility of forgetting the image password is minimal.

Figure 12:
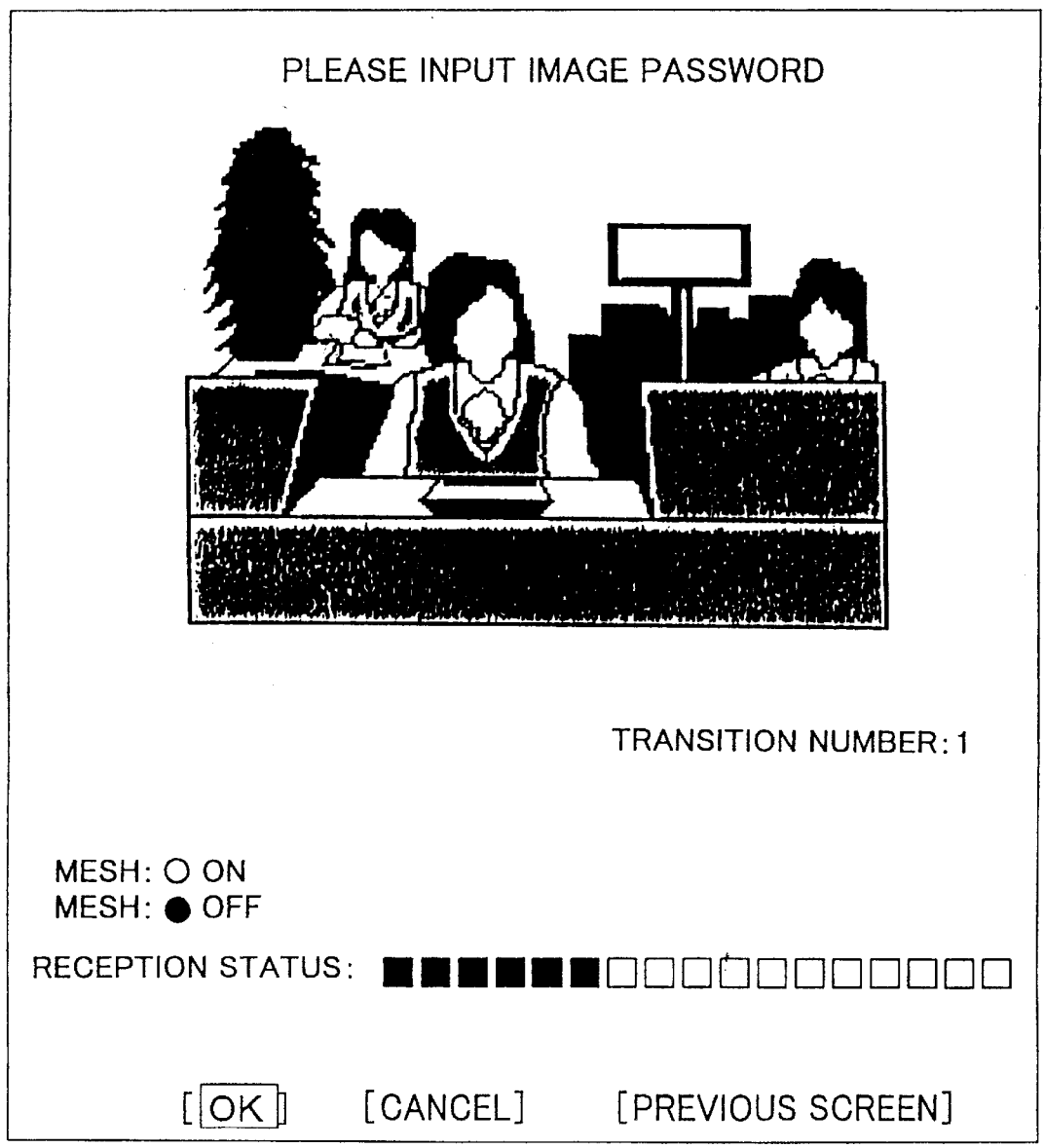
FIG. 12 is an explanatory diagram showing an example of a transition image.

For example, with the image shown in FIG. 11, the case can be considered where after inputting ones date of birth from the ten keys of the contents tool, an image password specifying the bank is set from the background image. Then, in the case where the transition image as shown in FIG. 12 is displayed, an image password specifying the window and the reception lady can be set. That is to say, the sequential specifying operation can be grasped as a story type image, and this image stored. In this case, for a third person, it is not possible to conjecture which image password is set for the displayed image, and hence an extremely strong security is ensured.

In step 26, the encrypted information is decoded. That is to say, the encrypted information registered in the encrypted information data base 22 is decoded by means of an image encryption solution. In the abovementioned example, the encrypted information is "0034" and the image encryption solution is "1200" and hence by adding both of these this is decoded to the information to be encrypted "1234".

In step 27, the decoded information to be encrypted is displayed, or the information to be encrypted is output to the outside. At this time, a browser to be used can be prepared based on the use environment registered in the setting information data base 24, and a host for the transmission destination specified based on the previous use address registered in the encrypted information data base 22.

In step 28, processing for the case where the image passwords do not match is carried out. That is to say, an error message to the effect that the image passwords do not match is displayed.

With the processing for the above described step 20 through step 28, by inputting the image password, access to the electronic information is authorized. After this, the decoding of the encrypted information is carried out and access to the electronic information is executed.

Figure 13:
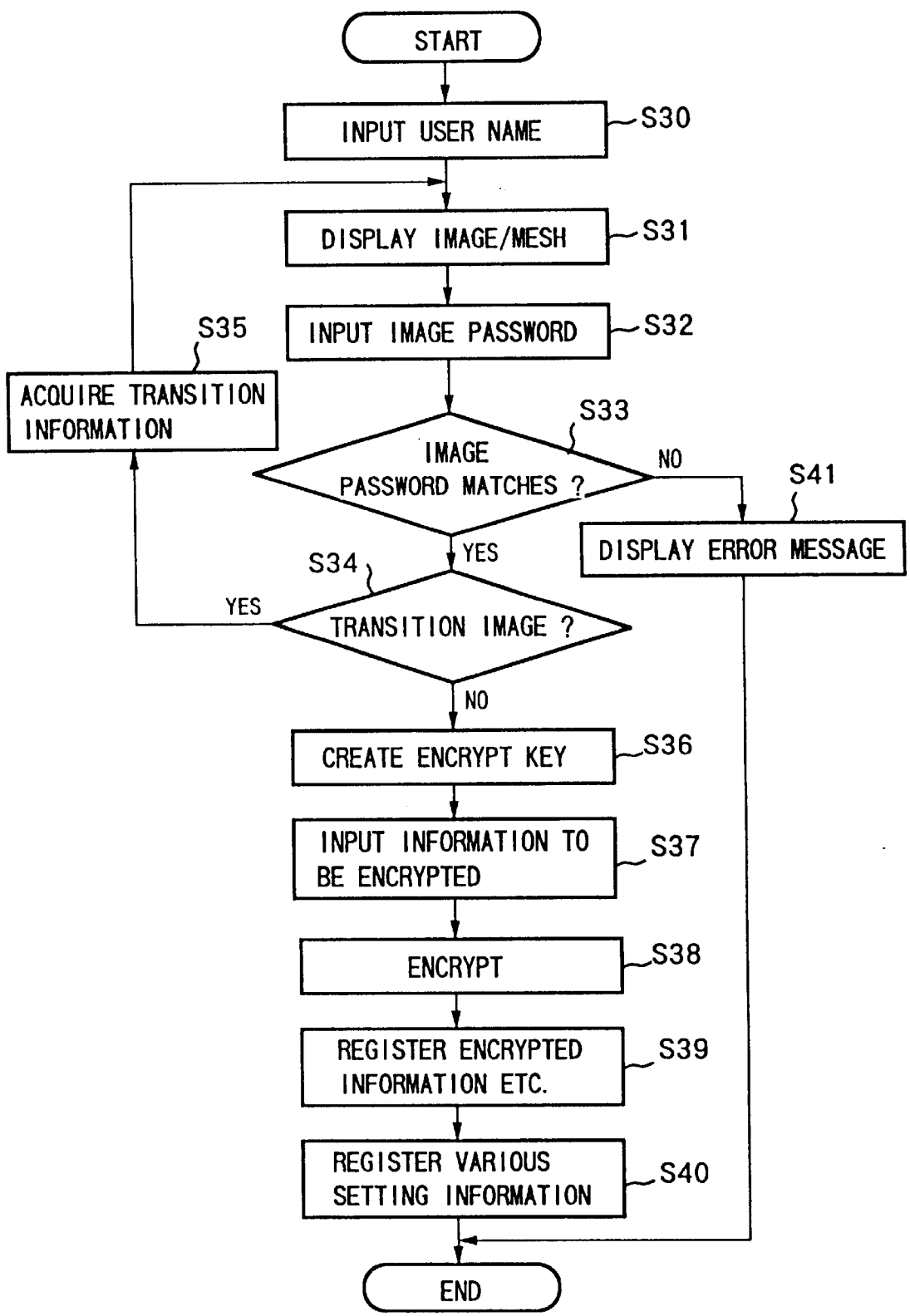
FIG. 13 is a flow chart for explaining additional registration processing.

FIG. 13 is a flow chart illustrating an additional registration processing. With the flow chart shown in FIG. 13, the processing of step 30 through step 35, and step 41 is the same as the processing for step 20 through step 25 and step 28 for the image password use processing shown in FIG. 9. Furthermore, the processing of step 36 through step 40 is the same as the processing of step 9 through step 13 for the initial registration processing shown in FIG. 2. Consequently, in the following description, only an outline of this processing is given, and the appropriate sections should be referred to for details.

In step 30, input of the user name is carried out.

In step 31, display of the image and mesh is carried out.

In step 32, input of the image password is carried out.

In step 33, judgment is made as to whether or not the input image password matches the image password registered in the initial registration processing. If the image passwords match, control proceeds to step 34 (YES), while if they do not match control proceeds to step 41 (NO).

In step 34, judgment is made as to whether or not there is a transition image. If there is a transition image, control proceeds to step 35 (YES), while if no transition image control proceeds to step 36 (NO).

In step 35, the transition information identified by the transition information code registered in the setting information data base 24 is acquired.

In step 36, creation of the encrypt key is carried out.

In step 37, the information to be encrypted is input.

In step 38, encryption of the information to be encrypted and creation of the image encryption solution are carried out.

In step 39, the encrypted information and the image encryption solution are registered in the encrypted information data base 22.

In step 40, the various setting information set or created in step 30 through step 35 is registered in the setting information data base 24.

In step 41, an error message to the effect that the image passwords do not match is displayed.

With the processing of step 30 through step 41 as described above, only when the input image password matches the set image password, is additional registration of the information to be encrypted possible. Furthermore, when the information to be encrypted is input, this is encrypted by means of the encrypt key created based on the image password, and additionally registered in the encrypted information data base 22. The information to be encrypted registered in the encrypted information data base 22 is severally registered with respect to the same user code and image encryption solution as shown in FIG. 14. In this way a plurality of encrypted information can be registered with respect to one image password. Moreover, since the previous use address is registered for each of the respective encrypted information, then at the time of using the encrypted information, then it is not necessary to separately set the address of the transmission destination to which the information to be encrypted is sent.

Figure 15:
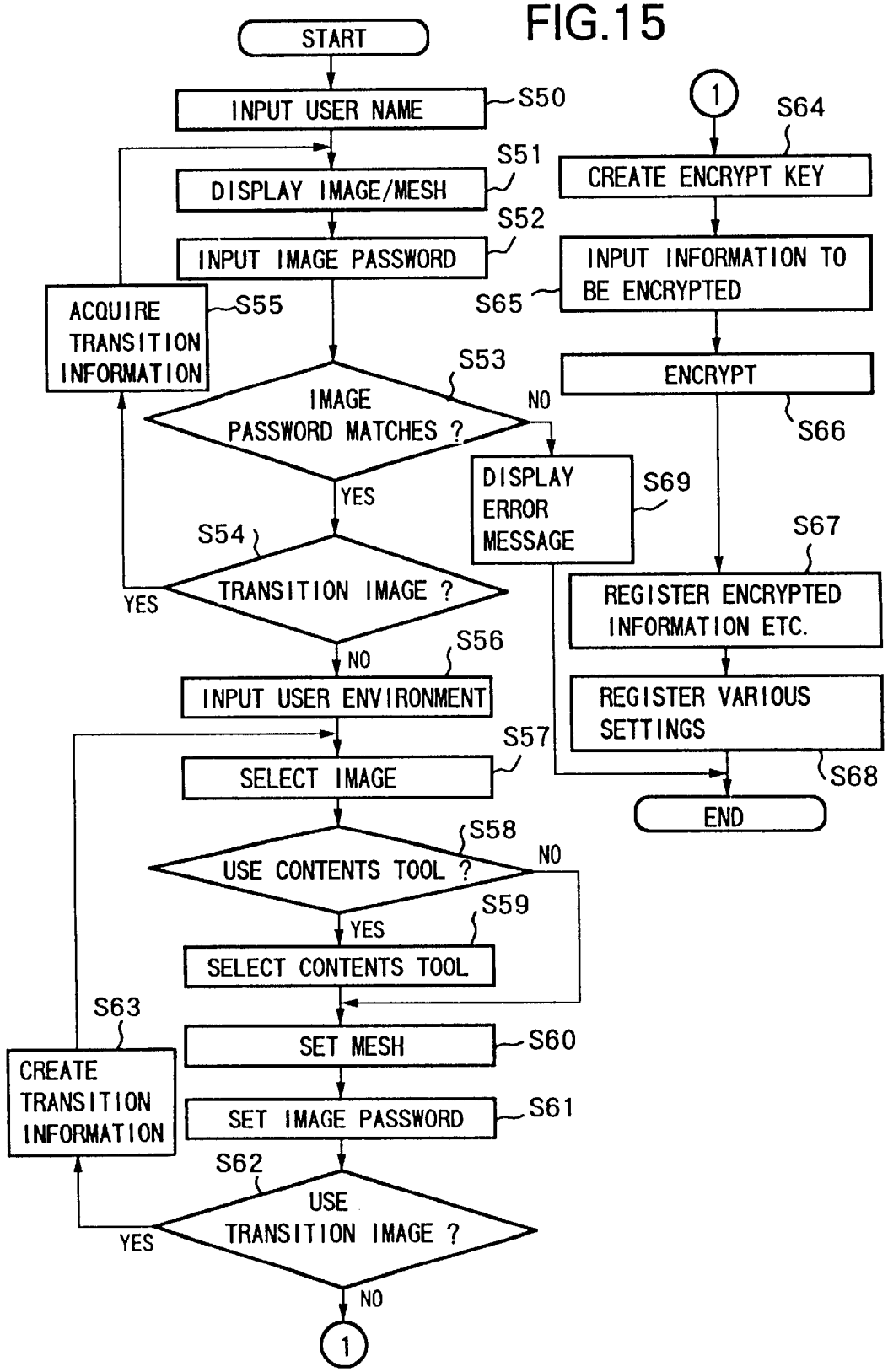
FIG. 15 is a flow chart for explaining modification processing.

FIG. 15 is a flow chart illustrating an update processing. With the flow chart shown in FIG. 15, the processing of step 50 through step 55, and step 69 is the same as the processing of step 20 through step 25 and step 28 for the image password use processing shown in FIG. 9. Furthermore, the processing of step 56 through step 68 is the same as the processing of step 1 through step 13 for the initial registration processing shown in FIG. 2. Consequently, in the following description, only an outline of the processing is given, and the appropriate sections should be referred to for details.

In step 50, input of the user name is carried out.

In step 51, display of the image and mesh is carried out.

In step 52, input of the image password is carried out.

In step 53, judgment is made as to whether or not the input image password matches the image password set in the initial registration processing section 70. If the image passwords match, control proceeds to step 54 (YES), while if they do not match control proceeds to step 69 (NO).

In step 54, judgment is made as to whether or not there is a transition image. If there is a transition image, control proceeds to step 55 (YES), while if no transition image control proceeds to step 56 (NO).

In step 55, the transition information identified by the transition information code registered in the setting information data base 24 is acquired.

In step 56, the user environment is set.

In step 57 through step 59, the image is set.

In step 60, the mesh which is superimposingly displayed on the background image is set.

In step 61, the image password is set.

In step 62, selection is made as to whether or not to use transition images. In the case where transition images are used, control proceeds to step 63 (YES), while in the case where transmission images are not used, control proceeds to step 64 (NO).

In step 63, the transition information for displaying transition images is created, and this transition information is registered in the setting information data base 24.

In step 64, creation of the encrypt key is carried out.

In step 65, the information to be encrypted is input.

In step 66, encryption of the information to be encrypted and creation of the image encryption solution are carried out.

In step 67, the encrypted information and the image encryption solution are registered in the encrypted information data base 22.

In step 68, the various setting information set or created in step 56 through step 63 is registered in the setting information data base 24.

In step 69, an error message to the effect that the image passwords do not match is displayed.

With the processing of step 50 through step 69, only when the input image password matches the set image password, is updating of the set user environment, the image, the information to be encrypted and so on, possible.

Now, in the above described embodiment, the electronic information management system 10 incorporates collectively a data base section 20, an initial registration processing section 40, an image password use processing section 70, an additional registration processing section 90, and a modification processing section 100. However the construction is not limited to this. That is to say, with an automatic cash dispensing device of a bank, the automatic cash dispensing device function can be sufficiently realized if just the image password use processing section 70 is provided. In this case, an image password is used instead of a conventional password using numbers, or together with a password using numbers.

Next, there will be described an electronic money system wherein an electronic money is an object to be managed, as another embodiment of an electronic information management system according to the present invention.

Figure 16:
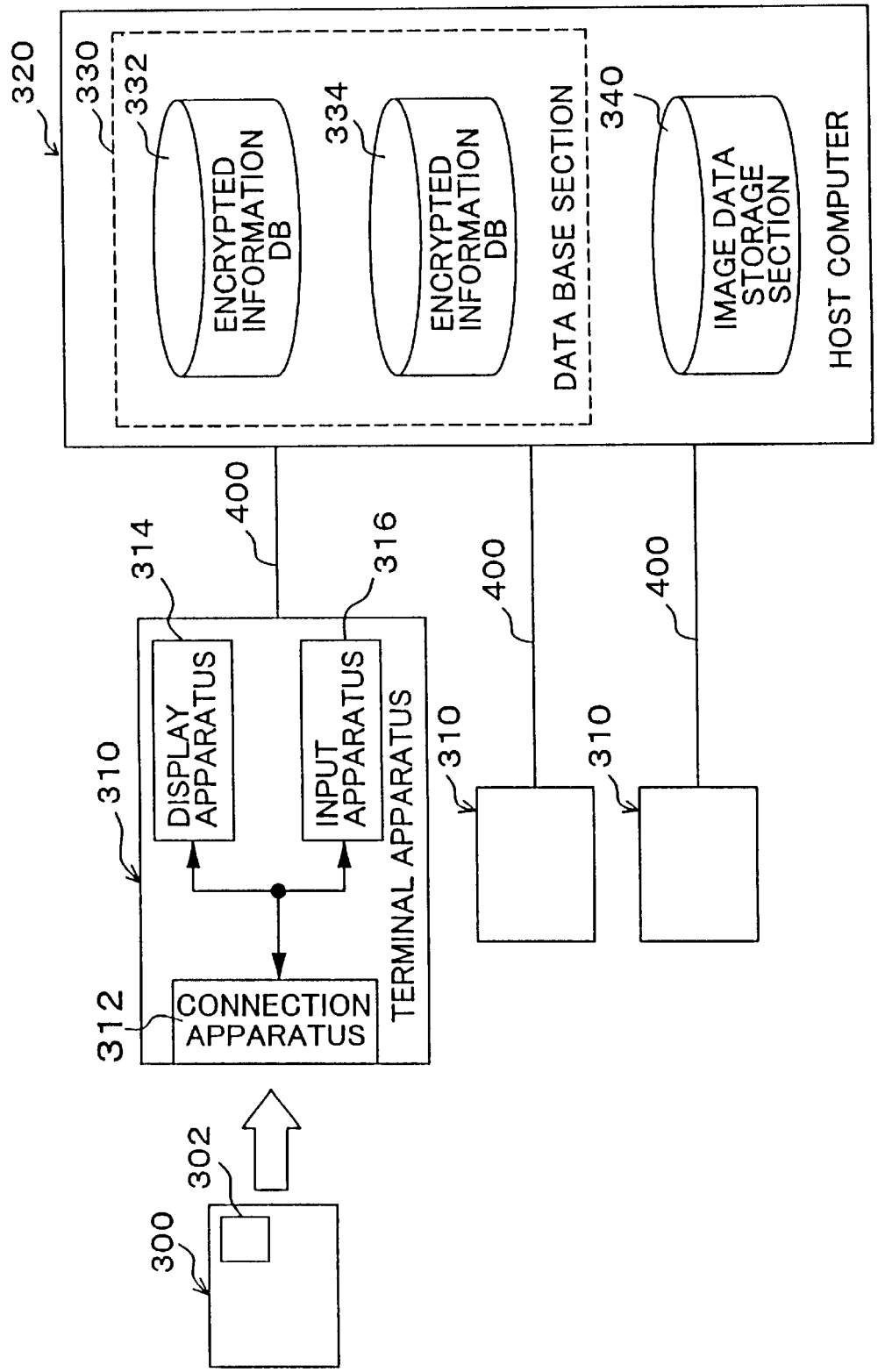
FIG. 16 is a block diagram showing another embodiment of an electronic information management system according to the present invention.

The electronic money system comprises an IC card 300, at least one terminal apparatus 310, and a host computer 320, as shown in FIG. 16.

The IC card 300 which is provided with an IC chip 302 incorporating a CPU and a memory, has a function as a computer of a minimum construction. In the memory is stored a program and information on the electronic money such as deposit date, payment record and a balance (to be referred to money information hereunder). In future, it can be considered that personal information such as insurance data is stored in the memory so that the personal information shall be used by means of the same IC card.

The terminal apparatus 310 comprises a connection apparatus 312 (code information reading device), a display apparatus 314 (image display device), and an input apparatus 316 (image specifying device). The connection apparatus 312 is constituted of such as a card reader or an EEPROM (Electric Erasable and Programmable Read Only Memory) writer, and provides an interface function for electrically connecting the IC card 300 and the terminal apparatus 310. The display apparatus 314 is constituted of a display such as CRT or LCD, and provides a function for displaying various operation statuses. The input apparatus 316 is constituted of such as a touch panel mounted on a display surface of the display apparatus, and provides a function for inputting such as an image password for utilizing the electronic money.

The host computer 320 is connected to each terminal apparatus 310 via each communication line 400, and comprises a data base section 330 and an image data storage section 340 (image storing device). The data base section 330 comprises an encrypted information data base 332 wherein encrypted information or the like is registered, and a setting information data base 334 wherein a variety of setting information is registered. In the image data section 340 is stored image data constituting an input screen for the image password. Here, since the data base section 330 is same as the data base section 20 in FIG. 1, the details thereof should be referred to the description for the data base section 20.

When the IC card 300 is inserted into the terminal apparatus 310, the IC chip 302 is electrically connected to the input apparatus 316 and the display apparatus 314 via the connection apparatus 312, to thereby constitute a computer provided with the input apparatus 316 and the display apparatus 314. That is, the IC card 300 and the terminal apparatus 310 are integrated with each other, and function as the processing function selection section 30, the initial registration processing section 40 and the image password use processing section 70 shown in FIG. 1. However, due to the property of electronic money system, the additional registration processing section 90 and the modification processing section 100 are not necessarily be provided.

In order to start the use of electronic money, it is required to set a user name and image passwords, as an initial registration processing. For performing the initial registration processing, the IC card 300 may be inserted into the terminal apparatus 310 and then the initial registration processing same as shown in the flow chart of FIG. 2 may be carried out. In the initial registration processing, it is required to add at least a function for recording the code and name of a user on the IC chip 302 of the IC card 300. This is because the code and name of the user are code information of the lowest demand for certifying the user.

Further, the image data taken by the user by means of a digital camera and the like may be used for the image data constituting the input screen for the image password. In this case, the terminal apparatus 310 may be provided with an interface for inputting the image prepared by the user, such as a floppy disk drive.

There will be described a method for actually using the electronic money. First, the deposit processing should be made for depositing money in the IC card 300. That is, since in the initial registration processing, the IC card 300 is merely initialized, the money information indicates "the balance is 0". Therefore, the deposit processing should be made in the IC card 300. In this embodiment, such a construction that the deposit processing is made in the IC card 300 via a credit company, is adopted. However, not only such a construction, but also other constructions for making, such as, the deposit processing by the currency or the deposit processing from the account of bank, may be adopted.

Figure 17:
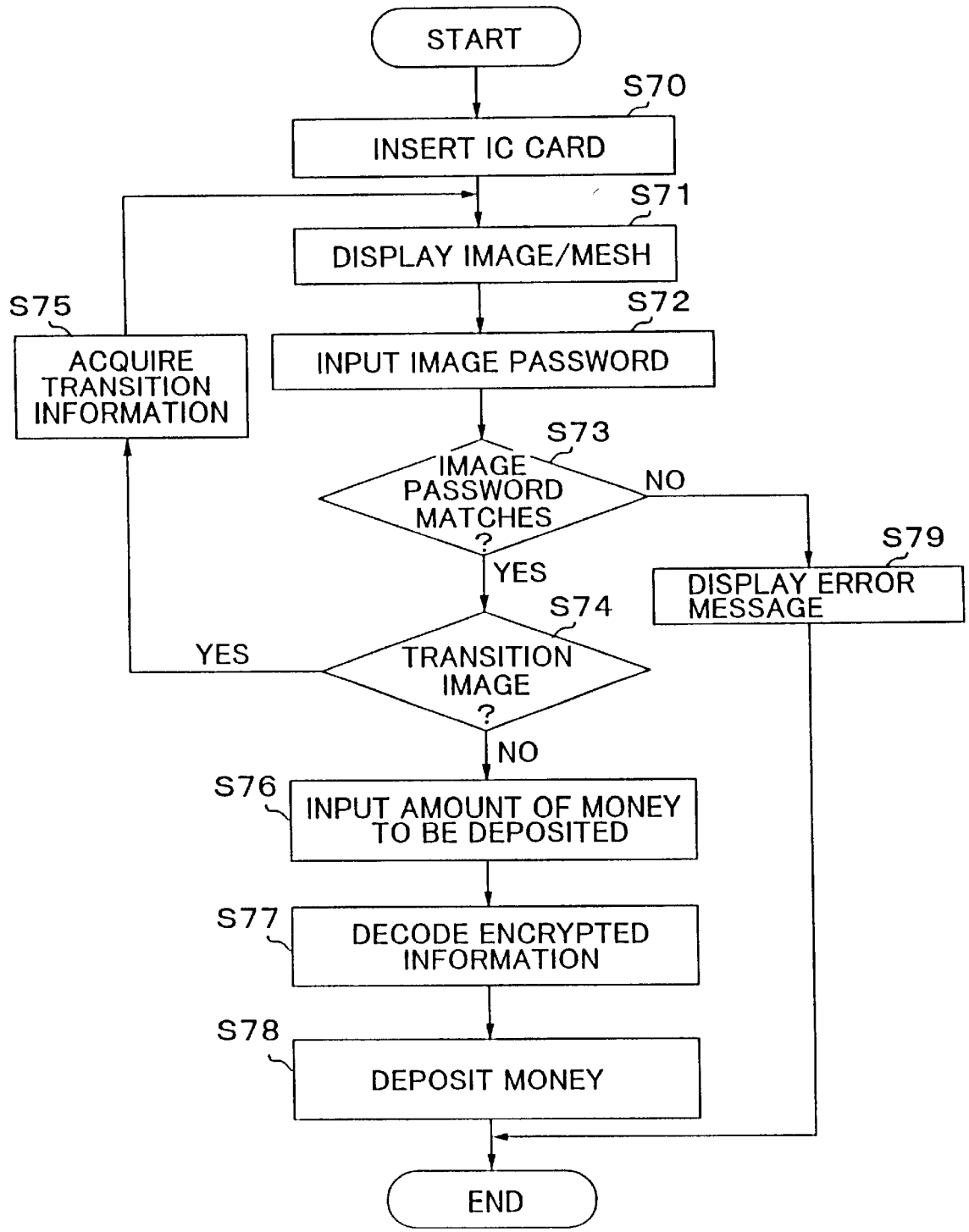
FIG. 17 is a flow chart showing deposit processing of electronic money.

The deposit processing is made according to the flow chart of FIG. 17. The same processing as the image password use processing (refer to FIG. 9) will be described briefly.

In step 70, when the IC card 300 is inserted into the terminal apparatus 310, the code and name of the user stored in the IC chip 302 are read in the host computer 320 via the terminal apparatus 310 and the communication line 400. Then, in the host computer 320, the image data and the like constituting the input screen for the image password are searched based on the code of the user and the like, and the search result is returned to the terminal apparatus 310. That is, by inserting the IC card 300, input of user name has been carried out. This processing corresponds to code information reading device, code information reading step and code information reading function.

In step 71, display of the image and mesh is carried out.

In step 72, input of the image password is carried out.

In step 73, judgment is made as to whether or not the input image password matches the image password set by the initial registration processing. If judged that the image passwords match, control proceeds to step 74 (YES), while if the image passwords do not match, control proceeds to step 79 (NO).

In step 74, judgment is made as to whether or not there is a transition image. In the case of a transition image, control proceeds to step 75 (YES). On the other hand, in the case of no transition image, control proceeds to step 76 (NO).

In step 75, transition information identified by transition information code registered in the setting information data base 334 is acquired.

In step 76, an amount of money to be deposited in the IC card 300 is input. Since the amount of money is merely input in the same operation as in the ATM system of bank and the like, the detailed description thereof is omitted. Further, in view of safety, it may be constituted to limit the amount of money to be deposited in one operation.

In step 77, the encrypted information is decoded.

In step 78, certification of the user (access authorization) is carried out in the terminal apparatus 310 based on the decoded information to be encrypted, and a predetermined amount of money is deposited in the IC card 300 from the credit company. This processing corresponds to access authorization device. Further, certification of the user may be carried out on the IC card 300. In this case, the security can be further improved.

In step 79, processing for the case where the image passwords do not match is carried out.

For making payment of the amount of goods purchased from a store and the like in electronic money, the IC card 300 is inserted into the terminal apparatus 310 provided in the store and the like wherein the user purchased goods. Then, after confirming the amount to be deposited displayed on the terminal apparatus 310, when the user pushes down a "payment button", the electronic money is paid from the IC card 300. Simultaneously with this, money information stored in the IC card 300 is added and updated.

Further, when the electronic money is paid, in order to certify the user, the construction may be such that the image password is input. If it is difficult to provide the terminal apparatus 310 in each store due to a problem of cost, a compact terminal dedicated to payment may be provided.

In the electronic money system mentioned above, the currency is not actually transferred between the user and the store, instead, electronic information named electronic money is transferred so that the payment of the amount of goods purchased is made. Then, the amount of goods purchased is actually paid to the store by the credit company in place of the user.

In the present embodiment, the image data constituting the input screen for the image password is stored in the image data storage section 340 of the host computer 320, however, the image data may be stored in dispersion in each terminal apparatus 310. If the memory capacitance of the IC chip 302 is large, the image data may be stored on the IC chip 302 utilizing the image compression technique. In this case, the IC chip 302 corresponds to storage device.

Further, if the electronic money system is used in a local area, the electronic money system may be constructed by the IC card 300 and the terminal apparatus 310. In this case, the data base section 330 and the image data storage section 340 should be provided in the terminal apparatus 310 or the IC card 300.

Security or access authorization of such as mobile PC, internet TV, game machine, home security and ATM system can be considered, to which the electric information management system is applied.

If a program for realizing such a function is recorded on a portable medium such as a magnetic tape, magnetic disc, magnetic drum, CD-ROM etc., then the electric information management program according to the present invention can be distributed in the market. Moreover, a person acquiring such a medium can easily constructed an electronic information management system using a standard computing system.

What is claimed is:

1. An electronic information management system comprising:

an IC card including:
means for storing a plurality of images corresponding to code information and coded access information;
means for decoding the coded access information based on a password; and
means for authorizing access to electronic information based on the coded access information decoded by said decoding means; and a terminal apparatus including:
image display means for severally displaying the images stored in said storing means of said IC card when connected with said IC card;
image specifying means for specifying specific parts of the images displayed by said image display means;
password generating means for generating a password based on the specific parts of the images specified by said image specifying means; and
password output means for outputting the password generated by said password generating means into said IC card.

2. An electronic information management system according to claim 1, wherein said image display means severally displays simultaneously the images.

3. An electronic information management system according to claim 1, wherein said image display means displays the images in a hierarchical structure one after another, in accordance with the specific parts of the images specified by said image specifying means.

4. An electronic information management system according to claim 1, wherein said image specifying means specifies specific parts of the image displayed by said image display means by way of rectangular regions which are marked out at predetermined spacing.

5. An electronic information management system according to claim 1, wherein said image specifying means specifies the specific parts of the image displayed by said image display means, by way of constituent elements constituting the image.

6. An IC card comprising:
   means for storing a plurality of images corresponding to code information and coded access information;
   means for decoding the coded access information based on information specifying specific parts of the images; and
   means for authorizing access to electronic information based on the access information decoded by said decoding means.

7. A terminal apparatus capable of being coupled to an IC card comprising:
   image display means for severally displaying a plurality of images stored in an IC card when coupled to said IC card which stores a plurality of images corresponding to code information and coded access information, decodes the coded access information based on a password, and authorizes access to electronic information based on the decoded access information;
   image specifying means for specifying specific parts of the images displayed by said image display means;
   password generating means for generating a password based on the specific parts of the images specified by said image specifying means; and
   password output means for outputting the password generated by said password generating means to said IC card.

8. An electronic information management method comprising:
   displaying a plurality of images corresponding to code information and coded access information stored in an IC card;
   decoding, on the IC card, the coded access information based on a password;
   specifying specific parts of the images displayed;
   generating a password based on the specific parts of the images specified in said specifying; and
   authorizing access to electronic information based on the decoded access information.

9. An electronic information management method according to claim 8, wherein said displaying comprises simultaneously severally displaying the images.

10. An electronic information management method according to claim 8, wherein said displaying comprises displaying the images in a hierarchical structure one after another, in accordance with the specific parts of the images specified by said specifying.

11. A recording medium on which is recorded an electronic information management program for controlling a computer and comprising a process of:
   authorizing access to electronic information based on a password, said authorizing being executed on an IC card;
   displaying a plurality of images corresponding to coded access information stored in the IC card;
   decoding, on the IC card, the coded access information based on a password;
   specifying specific parts of the images displayed; and
   generating a password based on the specific parts of the images specified by said specifying.

12. A recording medium on which is recorded an electronic information management program according to claim 11, wherein said displaying comprises simultaneously displaying the images.

13. A recording medium on which is recorded an electronic information management program according to claim 11, wherein said displaying comprises displaying the images in a hierarchical structure one after another, in accordance with the specific parts of the images specified.

14. An electronic information management system comprising:
   an IC card including:
      means for storing a plurality of images corresponding to code information and coded access information;
      means for decoding the coded access information based on a password; and
      means for authorizing access to electronic information based on the coded access information decoded by said decoding means; and
   a terminal apparatus including:
      image display means for severally displaying the images of different attributes;
      image specifying means for specifying specific parts of the images displayed by said image display means;
      password generating means for generating a password based on the specific parts of the images specified by said image specifying means; and
      password output means for outputting the password generated by said password generating means to said IC card.

15. An electronic information management system according to claim 14, wherein the images of different attributes are constituted by an image of a thing and an image of a plurality of characters.

16. An electronic information management system according to claim 14, wherein the images of different attributes are constituted by an image comprising a single image, and an image comprising a plurality of objects.

17. A recording medium on which is recorded an electronic information management program for controlling a computer and comprising a process of:
   displaying a plurality of images of different attributes which are stored in an IC card which stores a plurality of images corresponding to code information and coded access information and authorizes access to electronic information based on a password;
   decoding, on the IC card, the coded access information based on a password;
   specifying specific parts of the images displayed; and
   generating a password based on the specific parts of the images specified by said specifying.

18. An electronic information management system comprising:
   an IC card which stores a plurality of images corresponding to coded access information, decodes the coded access information based on a password, and authorizes access to electronic information based on the decoded access information; and a terminal apparatus including:
  a display displaying the images stored in the IC card when the IC card is coupled to said terminal apparatus;
  a user input apparatus which allows a user to specify specific parts of the images displayed;
  a password generator generating a password based on the specific parts of the images specified by the user; and
  an output device outputting the generated password to the IC card.

19. An electronic information management method comprising:
  displaying images corresponding to coded access information and stored in an IC card;
  decoding, on the IC card, the coded access information based on a password;
  enabling a user to specify specific parts of the images displayed;
  generating a password based on the specific parts of the images specified by the user; and
  authorizing access to electronic information based on the decoded access information.

20. An electronic information management method comprising:
  displaying images corresponding to coded access information and stored in an IC card;
  decoding, on the IC card, the coded access information based on a password;
  enabling a user to specify specific parts of the images displayed;
  generating a password based on the specific parts of the images specified by the user;
  decoding encrypted information corresponding to the password;
  providing the decoded information to be encrypted; and
  authorizing access to electronic information based on the decoded access information.

* * * * *